US012697631B2

(12) United States Patent
Fan et al.

(10) Patent No.: US 12,697,631 B2
(45) Date of Patent: Aug. 4, 2026

(54) SPRAY HEAD

(71) Applicant: Phoenix Industries Pty Ltd, Bayswater (AU)

(72) Inventors: Huijue Fan, Bayswater (AU); Pengyuan Yao, Bayswater (AU); Ban Hsi Liu, Bayswater (AU); Marco Magana, Bayswater (AU)

(73) Assignee: Phoenix Industries Pty Ltd., Bayswater (AU)

( * ) Notice: Subject to any disclaimer, the term of this patent is extended or adjusted under 35 U.S.C. 154(b) by 127 days.

(21) Appl. No.: 18/566,140

(22) PCT Filed: Jun. 2, 2022

(86) PCT No.: PCT/AU2022/050544
§ 371 (c)(1),
(2) Date: Dec. 1, 2023

(87) PCT Pub. No.: WO2022/251918
PCT Pub. Date: Dec. 8, 2022

(65) Prior Publication Data

US 2024/0342732 A1 Oct. 17, 2024

(30) Foreign Application Priority Data

Jun. 2, 2021 (AU) ................................ 2021901642

(51) Int. Cl.

| | |
|---|---|
| ***B05B 1/34*** | (2006.01) |
| ***B05B 1/06*** | (2006.01) |
| ***B05B 1/18*** | (2006.01) |
| ***B05B 15/50*** | (2018.01) |

(52) U.S. Cl.
CPC .............. *B05B 1/3447* (2013.01); *B05B 1/06* (2013.01); *B05B 1/185* (2013.01); *B05B 15/50* (2018.02)

(58) Field of Classification Search
CPC ......... B05B 1/3447; B05B 1/06; B05B 1/185; B05B 15/50; B05B 12/082; B05B 7/10; B05B 1/341; B05B 1/3426; B05B 1/3405
See application file for complete search history.

(56) References Cited

U.S. PATENT DOCUMENTS

| | | | | |
|---|---|---|---|---|
| 10,399,095 B1 | | 9/2019 | Bobba | |
| 10,421,083 B2 | * | 9/2019 | Winter | B05B 1/12 |

FOREIGN PATENT DOCUMENTS

| | | | | |
|---|---|---|---|---|
| CN | 211801707 | * 10/2020 | | B05B 1/18 |
| CN | 112403698 | * 2/2021 | | B05B 12/082 |
| JP | 201245368 | * 3/2012 | | A61H 33/10 |
| WO | WO 2013/141719 A1 | 9/2013 | | |
| WO | WO 2019/213701 A1 | 11/2019 | | |
| WO | WO 2022/251918 A1 | 12/2022 | | |

OTHER PUBLICATIONS

Written Opinion for PCT/AU2022/050544 dated Jul. 29, 2022.

* cited by examiner

*Primary Examiner* — Christopher R Dandridge
(74) *Attorney, Agent, or Firm* — Womble Bond Dickinson (US) LLP

(57) ABSTRACT

A spray head including: an inlet for receiving fluid; a plurality of nozzles in fluid communication with the inlet; and a swirl inducer downstream of the inlet and adapted to produce, when in use, swirled fluid flow; wherein the plurality of nozzles are adapted to shape the swirled fluid flow exiting therefrom into a continuous jet of fluid of substantially dome shape.

15 Claims, 15 Drawing Sheets

SPRAY HEAD

FIELD OF THE INVENTION

The present invention relates to spray heads. More particularly, although not exclusively, the invention relates to spray heads in the form of shower heads, be they overhead or hand held.

BACKGROUND OF THE INVENTION

Shower heads typically comprise a housing having a plurality of nozzles in a lower surface thereof that, when in use, produce a stream of water droplets. One such shower head is disclosed in international (PCT) patent publication no. WO 2013/141719. An alternative shower head design is disclosed in international (PCT) patent publication no. WO 2019/213701. The nozzles of this latter shower head are adapted to produce a continuous jet of fluid having an elongate transverse cross-section. The jet of fluid may therefore appear generally "bell" shaped in side cross-section.

A problem of some prior shower heads is that they may not produce a satisfying spray of water droplets at low flow rates and/or in low pressure water supply conditions.

An object of the present invention is to provide a spray head and/or a shower head that overcomes, or at least ameliorates, one or more problems of prior spray heads/shower heads, or at least provides a useful alternative choice.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

In a first aspect, the present invention provides a spray head including:

an inlet for receiving fluid;

a plurality of nozzles in fluid communication with the inlet; and a swirl inducer downstream of the inlet and adapted to produce, when in use, swirled fluid flow;

wherein the plurality of nozzles are adapted to shape the swirled fluid flow exiting therefrom into a continuous jet of fluid of substantially dome shape.

Advantageously, a self-cleaning function can be achieved by providing swirled fluid flow at the plurality of nozzles, thereby reducing or preventing clogging thereof.

Further, the swirled fluid flow in combination with the shaping function provided by the plurality of nozzles enables the formation of the substantially dome shape flow that exits the nozzles. It will be appreciated that 'dome shape' herein refers to the three-dimensional shape or appearance of the flow after it exits the nozzle. The nozzle dictates this shape, at least in part. In some non-limiting examples, the dome shape can include a form that is substantially ellipsoidal, conical, hemispherical, or paraboloid. The dome shape characteristic exhibited by the flow exiting each nozzle can therefore provide enhanced spatial coverage. This means that the spray head can be provided with a reduced number of nozzles and still provide as much fluid coverage as some prior art spray heads that include a greater number of nozzles. The spray head can therefore work particularly well in low-pressure water supply applications.

The jet of fluid is "continuous" in the sense that it is a substantially integral body of fluid. The nozzle may be configured such that the body of fluid does not disintegrate into discrete droplets until approximately 8-40 mm, preferably 10-20 mm from a base of the spray head.

It will be understood that the swirl inducer can induce and/or generate swirled fluid flow when in use.

The plurality of nozzles may each include an external nozzle body that extends from an outer surface of the base, preferably substantially perpendicular thereto. Each external nozzle body may be substantially frustoconical in shape, having its narrower end at a downstream end of the external nozzle body.

In an embodiment, each nozzle of the plurality of nozzles defines a nozzle opening at a downstream end thereof. The nozzle openings may be provided in a base of the spray head. In an embodiment, each nozzle includes a plurality of recesses or cut-outs disposed about each nozzle opening configured to shape the fluid exiting the nozzle opening. As would be appreciated by a person skilled in the art, when the swirled fluid flow exits from the nozzle opening, it will expand/diverge. In the present example, due to the centrifugal force of the swirled fluid flow, the swirled fluid flow exiting the nozzle opening will tend to expand along and thereby be shaped by the recesses, thereby forming the substantially dome shape flow. The recesses may be elongate in a transverse direction relative to the spray head, and are preferably circumferentially disposed equidistantly about each nozzle opening. In an embodiment, four elongate recesses are provided, together defining a cross-shaped cut-out section, wherein the nozzle opening represents a centre of the cross shape. The cross-shaped cut-out section shapes the exiting flow to assist in forming the substantially dome shape and, in this example, the continuous jet of fluid will be substantially square shape in transverse cross-section. However, it will be appreciated that the number of recesses can vary, and thus the precise form of the dome shape, and its transverse or longitudinal cross-section, can vary. For example, three circumferentially disposed, equidistant recesses could be provided about the nozzle opening and this can shape the exiting flow such that the exiting flow creates a dome shape that is substantially triangle shaped in transverse cross-section (and so on for other recess/nozzle configurations). In an alternative embodiment, no external structure or arrangement (e.g. recesses) are provided about the nozzle opening in order to form the dome shape. In other words, the continuous jet of fluid of substantially dome shape is produced simply by the combination of the swirled fluid and the nozzle geometry.

Each recess may include a base portion and a pair of laterally opposed outwardly diverging sides extending from the base portion. The base portion is preferably rounded. Thus, the combination of the base portion and the pair of laterally opposed sides thereby present a smooth contact surface for shaping the swirled fluid that exits the nozzle opening and thereby provides the continuous jet of fluid of substantially dome shape.

The angle of expansion of the fluid exiting the nozzle opening may be less than or equal to 8°. Preferably, the angle of expansion ranges between about 4° and about 80.

The spray head may include a housing. The housing may define a fluid pathway for fluid entering the housing via the inlet and exiting the housing from the nozzles (specifically from the nozzle openings). The fluid pathway may include the swirl inducer.

Preferably, the housing includes an inner core disposed between the base and cover of the housing. The inner core may be substantially disk-shaped. In a preferred form, the plurality of nozzles may each include an external nozzle body that extends from a lower surface of the inner core (instead of from the base), preferably substantially perpendicular thereto. In such an arrangement, the base may include apertures corresponding in location with the external nozzle bodies when the inner core and base are assembled with one another, each aperture enabling passage of its respective nozzle body at least partly therethrough upon assembly. Each external nozzle body may be substantially frustoconical in shape, having its narrower end at a downstream end of the external nozzle body. In an embodiment, each nozzle of the plurality of nozzles defines a nozzle opening at a downstream end thereof. The nozzle openings may be provided in the inner core of the spray head.

In an embodiment, the plurality of nozzles are generally arranged in a circular ring. In one embodiment, the plurality of nozzles are arranged in a circular concentric ring array having two or more rings.

Preferably, the swirl inducer is adapted, when in use, to swirl fluid in a generally transverse plane of the spray head to produce the swirled fluid flow. In an embodiment, the swirl inducer is further adapted, when in use, to swirl fluid in a generally vertical plane of the spray head to produce the swirled fluid flow.

The swirl inducer is preferably in fluid communication with the inlet and disposed between the plurality of nozzle openings and the inlet, wherein the swirl inducer is configured to produce swirled fluid flow before the fluid reaches the nozzle openings, by providing or enhancing a rotational speed component of the fluid. As the swirled fluid flow exits the nozzle opening, the fluid expands and is shaped to produce the continuous jet of fluid of substantially dome shape. The swirl inducer may be disposed in the housing of the spray head. The cover of the housing may be fixedly attached to the base (and inner core if present). In an embodiment, the inlet is located in the cover. The swirl inducer may include structure formed on, with, or adjacent the base of the spray head. Alternatively, the swirl inducer includes structure formed on, with, or adjacent the inner core of the spray head. The structure is preferably configured, when in use, to induce or generate rotational motion in the fluid. The structure may include any suitable combination of bends, elbows, branches, baffles, cross-sectional changes, etc. The structure preferably includes a baffle arrangement (or part of a baffle arrangement) extending from an upper surface of the inner core.

Each of the plurality of nozzles may be associated with a separate and respective flow chamber, which forms a part of the fluid pathway. In some embodiments, at least a portion of the flow chamber forms a part of its respective nozzle. In other embodiments, the flow chamber may be entirely located within or defined by the respective nozzle. The flow chamber preferably extends from each respective nozzle opening and into the housing of the spray head. The flow chamber may extend from the outer surface of the base to an inner surface of the base. Alternatively, the flow chamber may extend from the lower surface of the inner core to the upper surface of the inner core. In such embodiments, the nozzle opening may define the terminus of the flow chamber, and a flow chamber inlet may define the start of the flow chamber. The flow chamber inlet may therefore be formed on the inner surface of the base or upper surface of the inner core, whereby the flow chamber is wholly situated within the base or inner core respectively. Preferably, the plurality of nozzles and their respective flow chambers are aligned in an axial direction. Each flow chamber may be a swirling chamber and therefore form part of the swirl inducer.

In a preferred embodiment, the fluid pathway may include at least one fluid conduit or channel in fluid communication with the inlet and configured to direct fluid to each flow chamber. The at least one fluid conduit or channel may be at least partly defined by the base, in particular the inner surface of the base. Alternatively, the at least one fluid conduit or channel may be at least partly defined by the inner core, in particular the upper surface of the inner core. Preferably, the at least one fluid conduit or channel may be defined at least in part by the baffle arrangement. The at least one fluid conduit or channel may define a substantially circular flow path. However, in other embodiments, the at least one fluid conduit or channel may define a flow path of different shape, such as square, rectangular, elliptical, triangular, etc. In one example, the at least one fluid conduit or channel defines a flow path that corresponds in shape to the spray head housing. The at least one fluid conduit or channel may be configured to convey fluid in a substantially transverse plane of the spray head. The fluid pathway may include a plurality of fluid conduits or channels, each fluid conduit or channel originating from a centre of the base or inner core and extending in a substantially transverse plane of the spray head towards a radially outer end of the base or inner core. Preferably, the plurality of fluid conduits or channels are angularly spaced relative to one another such that, in use, the fluid is substantially evenly distributed along each fluid conduit or channel.

In an embodiment, the fluid pathway includes a plurality of flow branches in fluid communication with the at least one fluid conduit or channel. The plurality of flow branches are preferably defined by structure of the base or inner core. For example, the plurality of flow branches may be defined by part of the baffle arrangement. Each of the plurality of nozzles may be associated with a separate and respective flow branch. In some embodiments, at least a portion of the flow branch forms a part of its respective nozzle. In other embodiments, the flow branch may be entirely located within or defined by the respective nozzle.

The flow branches may form part of the swirl inducer. The swirl inducer may further include corresponding diversion surfaces, each located downstream of a respective flow branch, configured to divert the fluid in a manner to enhance rotational motion of the fluid and thereby produce swirled fluid flow. Preferably, the diversion surface is defined by a surface of the flow chamber, such as a side wall of the flow chamber. The diversion surface may be a smooth, substantially curved surface. The plurality of flow branches preferably extend towards a respective flow chamber. The flow branches may be at least partly defined by the base or inner core, in particular the inner surface of the base or the upper surface of the inner core. The flow branches may be configured to convey fluid in a substantially transverse plane of the spray head. The flow branches preferably extend from the at least one fluid conduit or channel. Preferably, a longitudinal axis of each flow branch is offset relative to a longitudinal axis of the flow chamber, i.e. the respective longitudinal axes do not intersect. The longitudinal axis of the flow branch may lie in the transverse plane, and the longitudinal axis of the flow chamber may lie in a substantially vertical plane. In a preferred embodiment, the flow branches are disposed substantially tangentially to the flow chamber, in particular the flow chamber inlet, thereby causing fluid from the branch to impinge and traverse along the diversion surface in order to swirl the fluid in the flow chamber. The flow branches may have a converging cross-section towards their respective flow chambers in order to accelerate fluid through the branch and enhance the swirling effect.

In an embodiment, the swirl inducer includes structure defining a plurality of swirling regions in fluid communication with the at least one fluid conduit or channel. The plurality of swirling regions are preferably defined by structure of the base or inner core. For example, the plurality of swirling regions may be defined by part of the baffle arrangement. The swirling regions are preferably substantially circular in shape. Each of the plurality of nozzles may be associated with a separate and respective swirling region. In some embodiments, at least a portion of the swirling region forms a part of its respective nozzle. In other embodiments, the swirling region may be entirely located within or defined by the respective nozzle. Preferably, at least one flow chamber is associated with a respective swirling region. A longitudinal axis of the at least one fluid conduit or channel may be offset relative to a longitudinal axis of its associated swirling region(s), i.e. the respective longitudinal axes do not intersect. The longitudinal axis of the at least one fluid conduit or channel may lie in the transverse plane, and the longitudinal axis of its associated swirling region(s) may lie in a substantially vertical plane. In a preferred embodiment, each swirling region is disposed substantially tangentially to its associated fluid conduit or channel. In a preferred embodiment, a plurality of fluid conduits or channels are provided, each of the plurality of fluid conduits or channels being associated with one or more swirling regions of the plurality of swirling regions.

The swirl inducer may further include structure disposed within one or more (preferably each) swirling region, the structure configured to, when in use, produce swirled fluid flow. The structure may include a plurality of baffles extending upwardly from the inner core and spaced about the flow chamber inlet, wherein the baffles are configured, when in use, to produce swirled fluid flow. Preferably, flow passages are provided between each adjacent pair of baffles. The flow passages may be configured to convey fluid in a substantially transverse plane of the spray head. Preferably, a longitudinal axis of each flow passage is offset relative to a longitudinal axis of the flow chamber, i.e. the respective longitudinal axes do not intersect. The longitudinal axis of the flow passage may lie in the transverse plane, and the longitudinal axis of the flow chamber may lie in a substantially vertical plane. In a preferred embodiment, the flow passages are disposed substantially tangentially to the flow chamber, in particular the flow chamber inlet. The baffles may be substantially arcuate shaped. The baffles preferably include diversion surfaces, each located downstream of a respective flow passage, configured to divert the fluid in a manner to enhance rotational motion of the fluid and thereby produce swirled fluid flow. Preferably, the diversion surface is defined by an inner surface of the baffle. The diversion surface may be a smooth, substantially curved surface. The baffles may be at least partly defined by the base or inner core, in particular the inner surface of the base or the upper surface of the inner core. The baffles may form part of the baffle arrangement.

Preferably, the flow chamber includes structure defining a chamber flow path between the flow chamber inlet and nozzle opening, the chamber flow path adapted to promote or maintain swirling of the swirled fluid. The flow chamber may include a first section, a second section and a third section. In an embodiment, the first section has a constant cross-section, and may be substantially cylindrical in form. In an embodiment that includes the plurality of flow branches, the diversion surface may be defined by a side wall of the first section. The second section may be located downstream of the first section and is preferably of converging cross-section, thereby accelerating fluid as it passes therethrough. The third section may be located downstream of the first and second sections and is preferably of constant cross-section. The configuration of the first, second and third cross-sections helps to maintain swirling of the swirled fluid by providing generally rounded walls for the swirling fluid to travel along in some embodiments. However, in other embodiments, rather than the flow being swirled before the flow chamber or at an upstream end of the flow chamber as described above, the chamber flow path may be configured to induce or promote swirling in the flow. In other words, the structure defining the swirl inducer may be wholly located within the chamber flow path.

In an embodiment, each of the plurality of nozzles define a first part, a second part and a third part, wherein the first part includes the flow branch, the second part includes the flow chamber, and the third part includes the nozzle opening and the recesses or cut-outs configured to shape the fluid exiting the nozzle opening. Thus, in such an embodiment, and as will be appreciated from the above, the swirl inducer will form part of each of the plurality of nozzles. Hence, in use, the fluid moving through the nozzle is provided a rotational speed component, enabling it to open up in a substantially dome shape as soon as it leaves the nozzle because of the centrifugal force. The combination of the nozzle opening and the recesses/cut-outs is what enables the formation of the substantially dome shape in this embodiment. The fluid that flows out of the nozzle evolves into a fluid lamina that, because of instability induced by aerodynamic forces, breaks up into droplets.

In an alternative embodiment, each of the plurality of nozzles define a first part, a second part and a third part, wherein the first part includes the swirling region having the plurality of baffles, the second part includes the flow chamber, and the third part includes the nozzle opening configured to shape the fluid exiting the nozzle opening. Thus, in such an embodiment, and as will be appreciated from the above, the swirl inducer will form part of each of the plurality of nozzles. Hence, in use, the fluid moving through the nozzle is provided a rotational speed component, enabling it to open up in a substantially dome shape as soon as it leaves the nozzle because of the centrifugal force. The combination of the nozzle opening and swirled fluid is what enables the formation of the substantially dome shape in this embodiment. The fluid that flows out of the nozzle evolves into a fluid lamina that, because of instability induced by aerodynamic forces, breaks up into droplets Whilst some of the above embodiments describe a swirl inducer having dedicated structure to form swirled fluid flow at each nozzle, it will be appreciated that in alternative embodiments the swirl inducer may be located upstream of the nozzles in order to produce swirled fluid flow, which is then suitably conveyed to each nozzle. In a simpler variation, the fluid pathway need not include the flow chambers, and the swirled fluid may be directly conveyed towards the plurality of nozzle openings.

The spray head may include a fluid distribution conduit, an inlet of the fluid distribution conduit disposed in a generally central region of the spray head housing or base, preferably in direct fluid communication with the inlet. The fluid distribution conduit may be in fluid communication with the at least one fluid conduit or channel. In an embodiment, the fluid distribution conduit extends outwardly from the generally centrally located inlet in a transverse direction, i.e. substantially perpendicular to the inlet. The at least one fluid conduit or channel may then originate from the fluid distribution conduit.

In an embodiment where there is only one fluid conduit or channel, the fluid conduit or channel may have a substantially constant cross-section. This may assist in providing an even distribution of fluid to each nozzle, e.g. via each respective flow chamber. In alternative embodiments, the spray head includes a plurality of fluid conduits or channels, each fluid conduit in fluid communication with the inlet, and configured to direct fluid to the plurality of nozzles. In one example, the fluid distribution conduit may be configured to convey fluid to each fluid conduit or channel, with each fluid conduit or channel fluidly associated with a respective subset of the plurality of flow chambers (and hence a respective subset of the plurality of nozzles). Each of the plurality of fluid conduits or channel may therefore originate from the fluid distribution conduit. Preferably, the fluid conduits or channels have increasing cross-section the further they are located from the inlet. In one embodiment, the inlet is located at the generally central region of the spray head. In such an embodiment, the fluid conduits or channels have an increased cross-section the further radially outward they are located relative to the inlet. For example, and assuming a centrally located inlet, when the spray head has a plurality of fluid conduits or channels, the innermost fluid conduit or channel has a relatively smaller cross-section than the outermost fluid conduit or channel. By having this arrangement, a more even distribution of fluid in the spray head is achieved and therefore a more even distribution of fluid reaching the nozzles.

Preferably, each fluid conduit or channel of the plurality of fluid conduits or channels is formed in substantially the same shape, although this need not be the case. In an embodiment, the plurality of fluid conduits or channels define a substantially circular path, with the inlet located in the central region of the spray head (i.e. the spray head housing). The plurality of fluid conduits or channels may be radially spaced and disposed concentrically about the central region of the housing, whereby each fluid conduit or channel is adapted to communicate fluid to a discrete subset of the plurality of flow chambers (and hence communicate fluid to a discrete subset of the plurality of nozzles). In an alternative embodiment, the plurality of fluid conduits or channels define a generally straight path, with the inlet located in the central region of the spray head. Each fluid conduit or channel may be adapted to communicate fluid to a discrete subset of the plurality of flow chambers (and hence communicate fluid to a discrete subset of the plurality of nozzles).

In an embodiment, the swirl inducer further includes a plurality of inserts, each insert configured to be received in respective flow chambers and configured, when in use, to produce swirled fluid flow. Each insert may be in the form of a hollow body with a closed upstream end and an open downstream end, the insert having an external profile that substantially complements the flow chambers internal profile. The outer profile may be substantially cylindrical in shape and include one or more cut-out portions adapted to direct fluid towards one or more diversion surfaces located inside the hollow body, wherein the diversion surfaces are configured to swirl the fluid. The diversion surfaces may generally form part of an inner profile of the insert.

In an embodiment, the spray head may further include a back-flow prevention arrangement configured to substantially prevent fluid moving back upstream in the spray head. The back-flow prevention arrangement may include a plurality of flow resistance pockets spaced along a span of each fluid conduit or channel. The back-flow arrangement may therefore define a fixed-geometry passive check valve arrangement (also known as a "Tesla valve"). In such an arrangement, fluid generally travels with minimal resistance in a downstream direction, but is restricted from travelling back in an upstream direction. Each flow resistance pocket may extend in a transverse and upstream direction from its respective fluid conduit or channel. Thus, the spray head can be provided with a backflow prevention feature that can also provide better aeration of the fluid.

The spray head described above may be in the form of a shower head, such as an overhead shower or a hand shower.

In a second aspect, the present invention provides a spray head including:

- an inlet for receiving fluid;
- structure located downstream of the inlet and adapted to induce swirling in the fluid; and
- a plurality of nozzles, each defining a nozzle opening, adapted, when in use, to produce, from the swirled fluid, a continuous jet of fluid exiting the nozzle in a predetermined three dimensional form defined by one or more surfaces of the nozzle provided adjacent the nozzle opening.

It will be appreciated that features disclosed with respect to the first aspect of the invention are also applicable with respect to the second aspect of the invention, including different combinations of features disclosed.

In a third aspect, the present invention provides a spray head including:

- an inlet for receiving fluid;
- a plurality of nozzles, each defining a nozzle opening;
- a housing defining a fluid pathway between the inlet and the nozzle openings; and
- a swirl inducer located in the fluid pathway, upstream of the nozzle openings, wherein the swirl inducer is adapted, when in use, to produce swirled fluid flow;
- wherein the plurality of nozzles are adapted to shape the swirled fluid flow exiting therefrom into a continuous jet of fluid of substantially dome shape.

It will be appreciated that features disclosed with respect to the third aspect of the invention are also applicable with respect to the first and second aspect of the invention, including different combinations of features disclosed.

In a fourth aspect, the present invention provides a spray head including:

- an inlet for receiving fluid;
- a plurality of nozzles, each defining a nozzle opening; and
- a housing defining a fluid pathway between the inlet and the nozzle openings;
- wherein each of the plurality of nozzles includes:
  - a first part adapted to receive fluid from the fluid pathway;
  - a second part, downstream of the first part, adapted to produce swirled fluid flow from fluid received from the first part; and
  - a third part, downstream of the second part, adapted to shape the swirled fluid flow into a continuous jet of fluid of substantially dome shape when it exits the nozzle opening.

It will be appreciated that features disclosed with respect to the fourth aspect of the invention are also applicable with respect to the first, second and third aspects of the invention, including different combinations of features disclosed.

As used herein, except where the context requires otherwise, the term “comprise” and variations of the term, such as “comprising”, “comprises” and “comprised”, are not intended to exclude further additives, components, integers or steps.

Further aspects of the present invention and further embodiments of the aspects described in the preceding paragraphs will become apparent from the following description, given by way of example and with reference to the accompanying drawings.

DETAILED DESCRIPTION OF THE EMBODIMENTS

Figure 1:
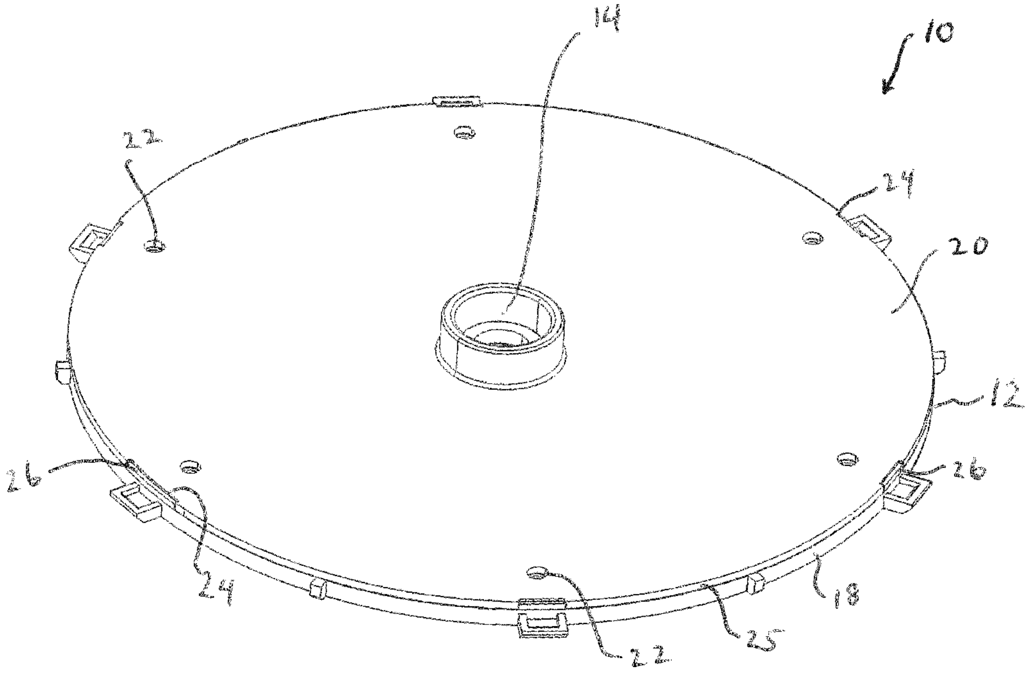
FIG. 1 is an upper perspective view of a shower head in accordance with an embodiment of the present invention.
Figure 2:
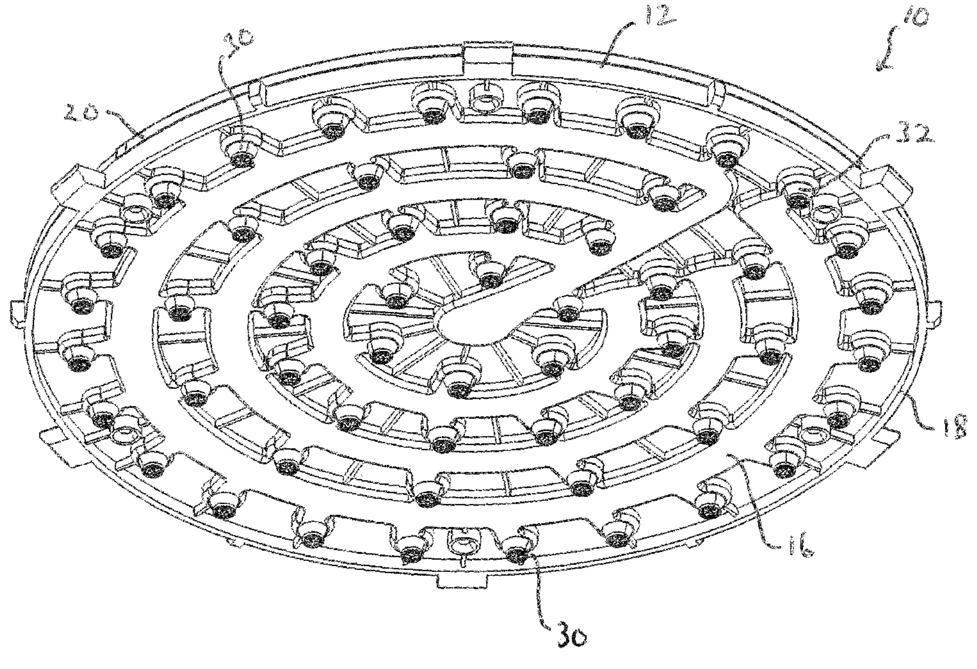
FIG. 2 is a lower perspective view of a shower head in accordance with an embodiment of the present invention.

Referring to FIGS. 1 and 2, there is shown a spray head according to one embodiment of the present invention. The spray head is in the form of a shower head 10 for use in an overhead shower, albeit the spray head described herein could alternatively be in the form of a hand shower or other similar spray head.

The shower head 10 includes a generally cylindrical housing 12, a central inlet 14 for receiving fluid, typically water, from a fluid conduit connected to a water supply (not shown), and a plurality of nozzles 30. Each nozzle 30 includes an external nozzle body 32 of substantially frusto-conical form, a narrower end of the frustum located at a downstream end of the nozzle body 32. Nozzle body 32 extends from a lower outer surface 16 of a base 18 of the housing 12 (see FIG. 2). It will be appreciated that the form of nozzle body 32 is just exemplary, and may be of any other suitable form. The plurality of nozzle bodies 32 are arranged in a circular concentric ring array having four rings in the current embodiment. In a hand shower application, which generally has a smaller housing than a typical overhead shower head, there may be fewer rings, e.g. only one ring. However, a person skilled in the art will appreciate that the number and arrangement of nozzles could be varied without departing from the scope of the present invention.

It will be appreciated that the housing 12 can comprise the base 18 and a cover 20 fixed together in any suitable manner known in the art. For example, cover 20 includes a plurality of holes 22 configured to receive a fastener (not shown) to secure the cover 20 with the base 18. Holes 22 are disposed circumferentially and equidistantly about the cover 20. Cover 20 also includes a plurality of grooves 24 directed generally radially inwardly from side wall 25 of cover 20. Grooves 24 are configured to matingly engage with corresponding tongue portions 26 extending towards cover 20 from base 18. Grooves 24 and tongue portions 26 therefore act as locating features in order to ensure correct assembly of the shower head 10. To ensure that housing 12 is fluidly sealed, cover 20 and base 18 can then be fixedly attached, for example by welding (with any other seals or sealing surfaces included as required).

Figure 3:
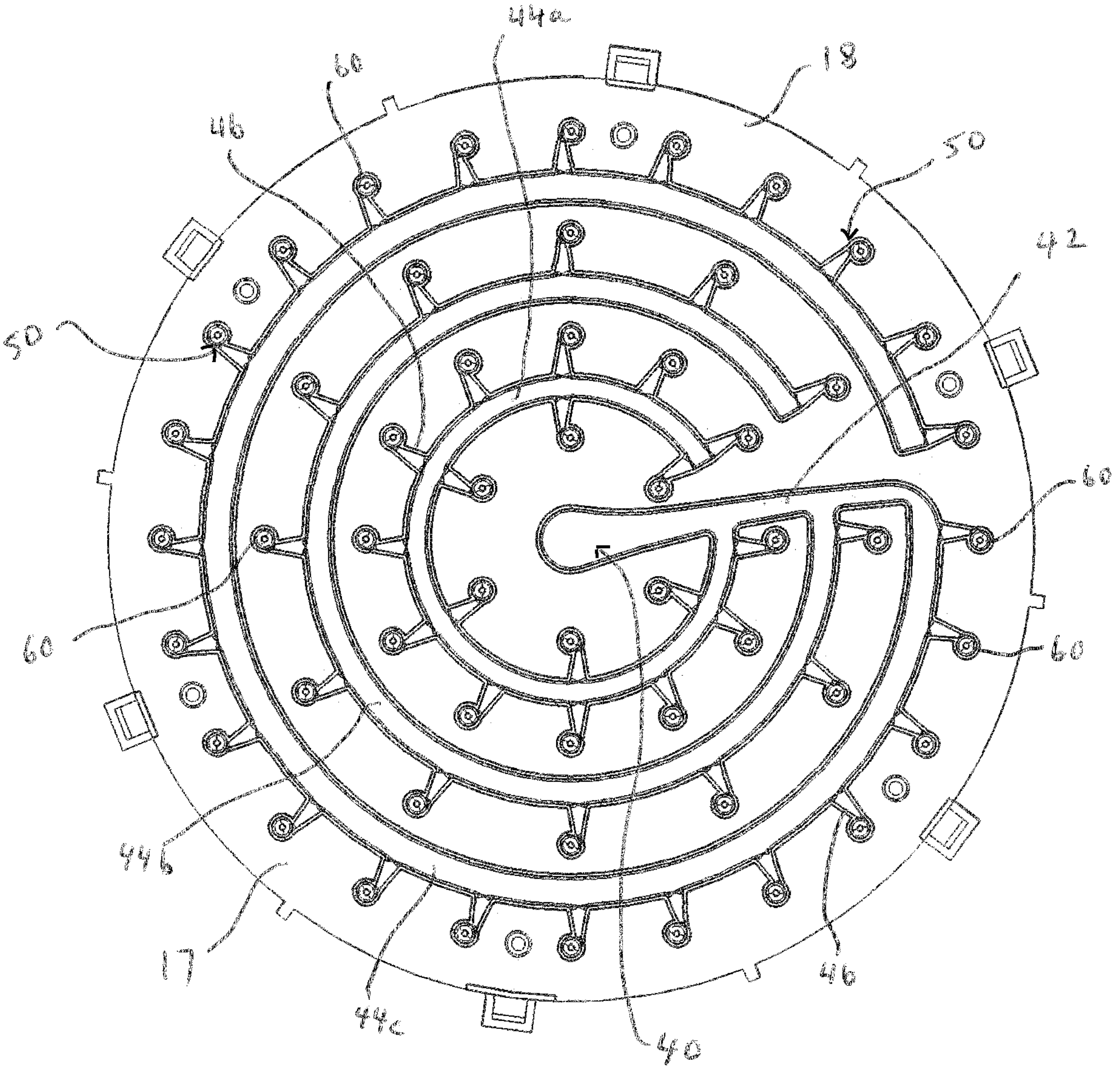
FIG. 3 is a top view of a base of the shower head of FIG. 1.
Figure 4:
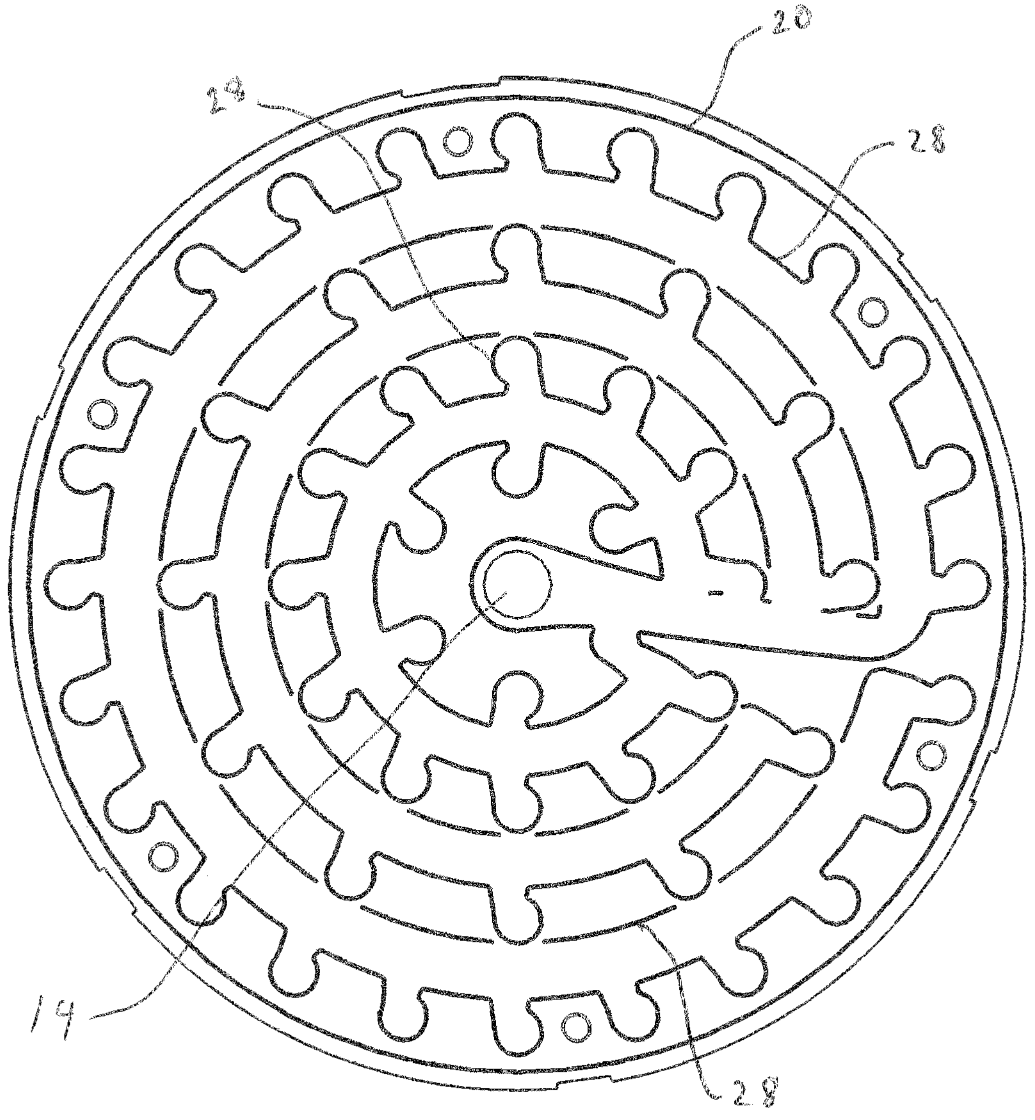
FIG. 4 is a bottom view of a cover of the shower head of FIG. 1.
Figure 5:
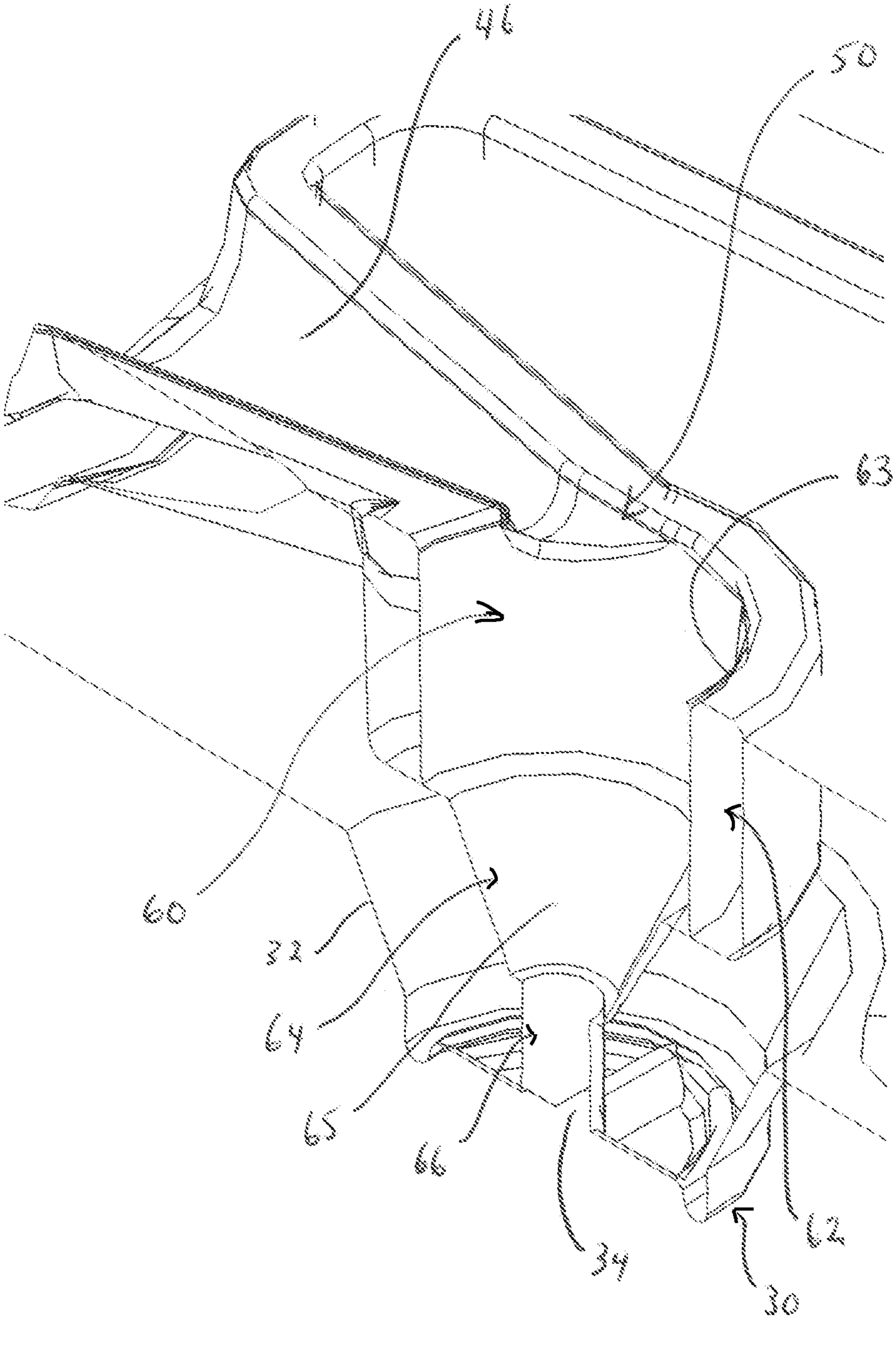
FIG. 5 is an upper perspective cross-sectional view of a portion of the base of FIG. 3.

Reference is now made to FIG. 3, which shows the base 18 of the shower head 10 with the cover 20 removed therefrom. As will be explained in greater detail below, housing 12 includes structure defining a fluid pathway 40, formed at least in part by base 18. The fluid pathway 40 defines a flow path for the fluid from its entry into housing 12 via inlet 14, to its exit from housing 12 via nozzle openings 34 (FIG. 5). In particular, a portion of the fluid pathway 40 includes structure that is configured to act as a swirl inducer 50 to enhance the rotational motion of the fluid, thereby producing swirled fluid flow, before it reaches the nozzle openings 34. This ‘preconditioning’ of the fluid before it reaches the nozzle openings 34 is important in producing the desired fluid pattern exiting nozzles 30, i.e. a continuous jet of fluid of substantially dome shape. Whilst in the depicted embodiment, the fluid pathway 40 is substantially defined by base 18, with only part of the fluid pathway 40 defined by inwardly protruding walls 28 of cover 20 (FIG. 4), in alternative embodiments, housing 12 may include structure that is formed on, with, or adjacent the base 18. For example, in an alternative embodiment, the fluid pathway 40 is substantially defined by cover 20.

Base 20 defines a flow distribution channel 42 in direct fluid communication with inlet 14 of housing 12. It will be appreciated with reference to FIG. 4 that flow distribution channel 42 originates from a location that is aligned axially with inlet 14 in the assembled shower head 10. Thus, all fluid entering the shower head 10 from inlet 14 is communicated within housing 12 via the flow distribution channel 42. Flow distribution channel 42 extends in a transverse direction (perpendicular to the axial direction) from a centre of the base 18 towards an outer end thereof. Flow distribution channel 42 has a converging cross-section area the further away it is from its origin so that fluid conveyed through the flow distribution channel 42 is accelerated. A plurality of radially spaced flow channels 44 (three in the depicted embodiment) each originate and extend sequentially from the distribution channel 42 from locations spaced along the span of the flow distribution channel 42. Each flow channel 44 is configured to communicate fluid to a plurality of flow chambers 60, each flow chamber 60 associated with a respective nozzle 30. In the present embodiment, it will be understood that each nozzle 30 is made up of three main parts—(1) flow branch 46 (described in greater detail below); (2) flow chamber 60; and (3) exit structure, include nozzle opening 34 and adjacent structure (examples of which are explained below) configured to shape swirled fluid flow exiting nozzle opening 34 into a continuous jet of fluid of substantially dome shape. However, it will be appreciated that in other embodiments, nozzle 30 may not include all three parts.

The flow channels 44 include a first flow channel 44*a*, a second flow channel 44*b* originating downstream of the first flow channel 44*a*, and a third flow channel 44*c* originating downstream of the second flow channel 44*b*. In the present example, distribution channel 42 terminates at the same location third flow channel 44*c* originates, whereby fluid that reaches the end of distribution channel 42 is conveyed through third flow channel 44*c*. The channels 44*a-c* extend along a substantially circular path around the base 18 and terminate adjacent the distribution channel 42 (and therefore their own point of origin). Thus, channels 44*a-c* span just under a full 360° path.

To ensure a more even distribution of fluid is provided throughout the fluid pathway 40, and thereby to each of the plurality of nozzles 30, flow channels 44 are each suitably dimensioned in cross-section to accomplish this. As the inlet 14 is located centrally with respect to housing 12, the cross-section area of the flow channels 44 increase with increased radial spacing from the inlet 14. In the present example, as the first flow channel 44*a* is the closest radially disposed flow channel 44 relative to inlet 14, first flow channel 44*a* has the smallest cross-section area, followed by the second flow channel 44*b*, which has the next largest cross-section area, with third flow channel 44*c* having the largest cross-section area as it is the flow channel 44 furthest away radially from the inlet 14. This arrangement ensures that a more even distribution of fluid is provided to the flow chambers 60 (and hence to the plurality of nozzles 30).

Each flow channel 44 includes a plurality of flow branches 46 extending in a radial direction therefrom and spaced along the span of each respective flow channel 44. It will be best appreciated in FIG. 3 that some of flow branches 46 extending from the first channel 44*a* extend in a radial direction inwardly and some flow branches 46 extend in a radial direction outwardly. In contrast, the flow branches 46 of the second and third flow channels 44*b,c* extend only in a radial direction outwardly. However, a person skilled in the art will appreciated that alternative arrangements may be employed and the arrangements will in part depend on the locations of the flow chambers 60 (and hence nozzles 30). Each flow branch 46 is configured to convey fluid from the flow channels 44 to a respective flow chamber 60. The flow branches 46 are substantially in the form of a half-frustoconical channel, with an upstream end representing the wider end of the half-frustoconical channel and the downstream end representing the narrower end of the half-frustoconical channel. Thus, flow branch 46 provides a converging flow path, thereby accelerating fluid as it moves towards the flow chamber 60. Whilst the flow branches 46 are represented as half-frustoconical channels in the depicted embodiment, it will be appreciated that the flow branches 46 may be of any other suitable form or shape. In fact, whilst flow branches 46 are configured to accelerate the fluid by virtue of their converging cross-section in this embodiment, in alternative embodiments, the flow branches may be provided with a constant or even diverging cross-section depending on how and where the fluid is to be swirled. Flow chamber 60 defines the terminus of the flow branch 46.

One of the functions of shower head 10 is to produce swirled fluid flow upstream of nozzle openings 34 (FIG. 5). The need to precondition the fluid in this way before it reaches nozzle openings 34 is important in producing the desired fluid pattern exiting nozzle openings 34, i.e. a continuous jet of fluid of substantially dome shape. To this end, shower head 10 is provided with a swirl inducer 50 adapted to produce, when in use, swirled fluid flow. It is to be understood that a swirl inducer as provided by the present invention is intended to represent any suitable means of producing swirled fluid flow upstream of the nozzle openings 34. In the present embodiment, the swirl inducer 50 includes the combination of each of the flow branches 46 and the flow chambers 60, and therefore the swirl inducer 50 forms part of nozzle 30 in this embodiment. Flow chamber 60 extends from an inner surface 17 of base 18 to the lower outer surface 16 of base 18, i.e. in the axial direction.

With reference to FIG. 5, flow chamber 60 includes a first, cylindrical portion 62 configured to receive at an upstream end thereof fluid from flow branch 46. Flow chamber 60 further includes a second, frustoconical portion 64, which extends from a downstream end of the cylindrical portion 62. The frustoconical portion 64 converges in a downstream direction, thereby accelerating the fluid that passes therethrough. Flow chamber 60 also includes a third, cylindrical portion 66, which extends from a downstream end of the frustoconical portion 64. The downstream end of the cylindrical portion 66 defines a nozzle opening 34 from which the swirled fluid exits the housing 12.

In this embodiment, the fluid is swirled due to the specific arrangement between the flow branch 46 and the flow chamber 60, particularly the cylindrical portion 62. Flow branch 46 extends in a transverse direction, substantially perpendicular to the flow chamber 60. However, in order to cause the fluid to swirl by enhancing the rotational motion of the fluid, a longitudinal axis of flow branch 46 is offset relative to a longitudinal axis of the flow chamber 60, i.e. the respective longitudinal axes do not intersect (as would be best appreciated from FIG. 3). In the present example, the flow branch 46 is substantially tangential to the flow chamber 60. Thus, when fluid from the flow branch 46 reaches flow chamber 60, rather than following a sharp 90° bend, this offset will cause the fluid to be directed to and impinge on side wall 63 of the cylindrical portion 62 of flow chamber 60, with the fluid diverted along side wall 63, thereby inducing the fluid to swirl during entry into the flow chamber 60. In other words, a rotational speed component is imparted on the flow. It will be appreciated that the fluid will be swirled in a generally transverse plane of shower head 10.

Figure 10:
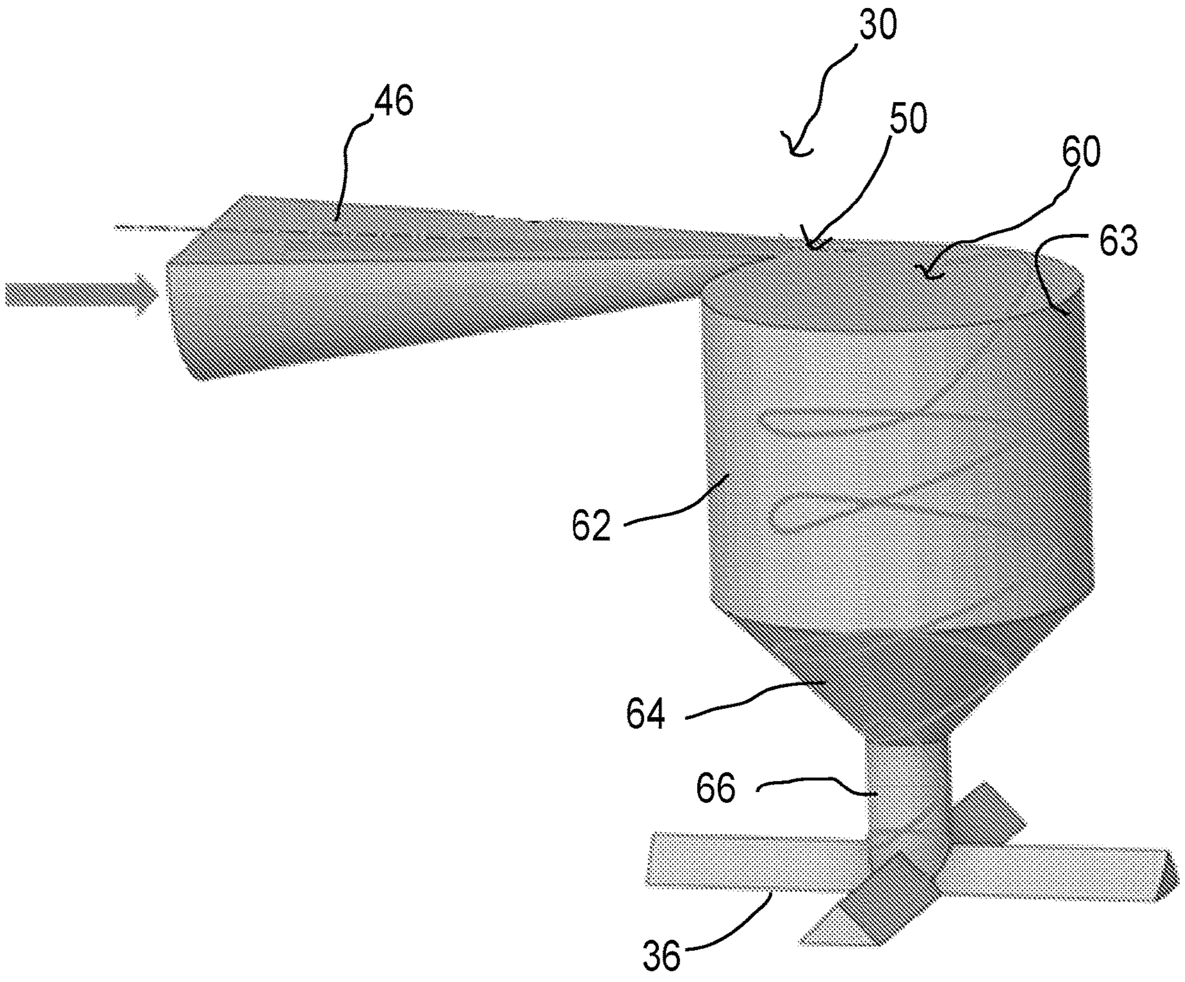
FIG. 10 is an illustration of fluid moving through the nozzle of the shower head of FIG. 2.

As well as playing a role in causing fluid to swirl, flow chamber 60 is also adapted to maintain swirling of the swirled fluid. For example, side walls 65 of frustoconical portion 64 provide a converging, rounded flow surface that maintains and continues to promote rotational motion of the fluid, as well as accelerating the swirled fluid as it ultimately approaches nozzle opening 34. An illustration of the fluid moving through the nozzle 30 is shown in FIG. 10.

Whilst the swirl inducer 50 of this described embodiment includes the specific arrangement of the flow branch 46 and flow chamber 60, it will be appreciated that other structure can be provided in housing 12, either directly formed with base 12 or otherwise provided in housing 12. For example, housing 12 may be provided with any suitable combination of bends, elbows, branches, baffles, cross-sectional changes, etc, in order to produce swirled fluid flow and convey this swirled fluid flow to the nozzle opening 34. In one alternative embodiment (not shown), the fluid is induced to swirl in the flow chamber 60. Therefore, in this embodiment, the flow branch is not part of the swirl inducer. Ultimately, the role of the swirl inducer 50 is to precondition, i.e. swirl, the fluid upstream of nozzle opening 34 so that swirled fluid reaches the nozzle opening 34. To this end, a person skilled in the art will appreciate that the structure of the swirl inducer can assume many forms or can be situated at other suitable locations within the shower head 10.

Figure 6:
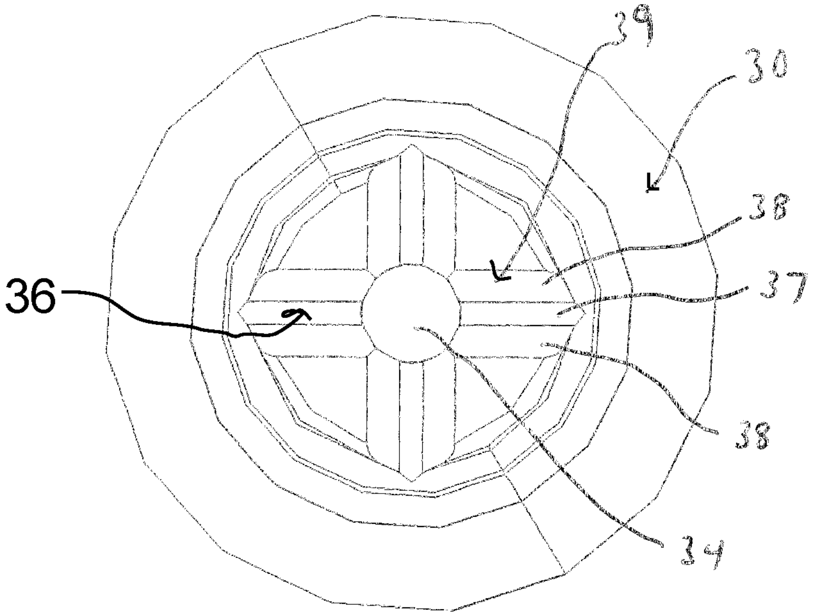
FIG. 6 is a bottom view of a nozzle of the shower head of FIG. 2.
Figure 7:
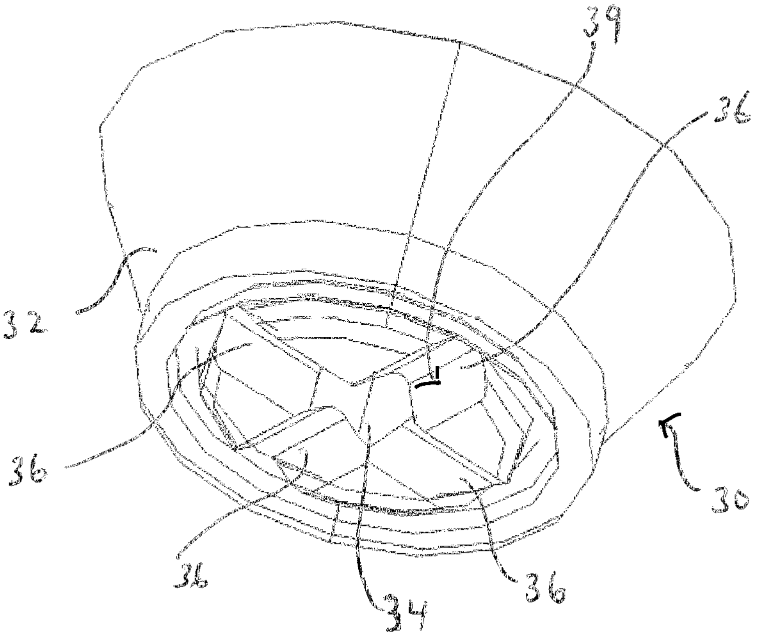
FIG. 7 is a lower perspective view of the nozzle of FIG. 6.

Reference is now made to FIGS. 6 and 7 that provide close-up views of one of the nozzles 30, and in particular the exit structure about nozzle opening 34. Nozzle 30 includes a plurality of elongate recesses 36 disposed about nozzle opening 34. The recesses 36 are elongate in a transverse direction and are circumferentially disposed equidistantly about the nozzle opening 34. Each recess 36 includes a rounded base 37 and a pair of laterally opposed outwardly diverging sides 38 extending from rounded base 37. Sides 38 and rounded base 37 together present a relatively smooth contact surface 39 for shaping the swirled fluid that exits the nozzle opening 34. Due to centrifugal force, the swirled fluid exiting the nozzle opening 34 will tend to expand along and thereby be shaped by the recesses 36. In the depicted embodiments, four recesses 36 are provided, together defining a cross-shaped cut-out section, wherein the nozzle opening 34 represents the centre of the cross shape.

Figure 8A:
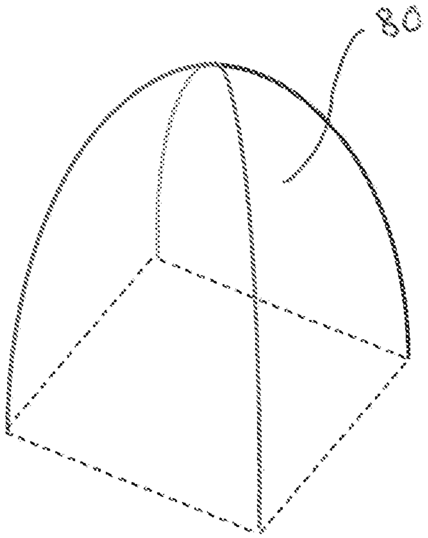
FIGS. 8*a*-8*d* are exemplary graphical depictions of a continuous jet of fluid of substantially dome shape produced by different nozzle configurations.

Thus, nozzles 30 are adapted to shape the swirled fluid flow exiting from nozzle opening 34 into a continuous jet of fluid of substantially dome shape. In other words, the fluid will have a three-dimensional shape or appearance after it exits the nozzle 30, this three-dimensional shape being formed by the nozzle 30 from the swirled fluid. In the present embodiment, the dome shape is formed by the expansion of the swirled fluid as it exits the nozzle opening 34. The centrifugal force of the swirled fluid urges the fluid in a generally radial direction along recesses 36 during expansion. The smooth surfaces of sides 38 and base 37 of recesses 36 shape the fluid into a continuous jet, with (in the present example) the appearance of four stream portions having a common origin. An exemplification of the continuous jet of fluid of substantially dome shape produced by the nozzle 30 is shown in FIG. 8*a*. The dome shape of the continuous jet of fluid 80 will be of substantially square shape in transverse cross-section.

Figure 8B:
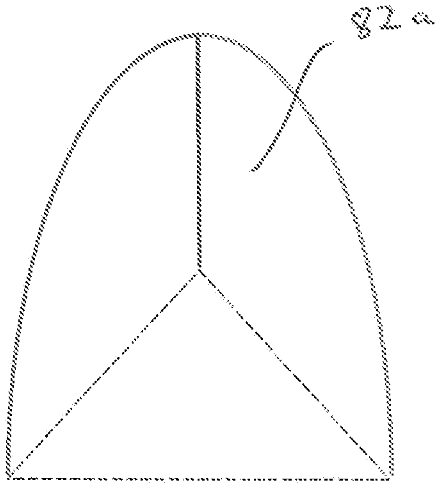
Figure 8C:
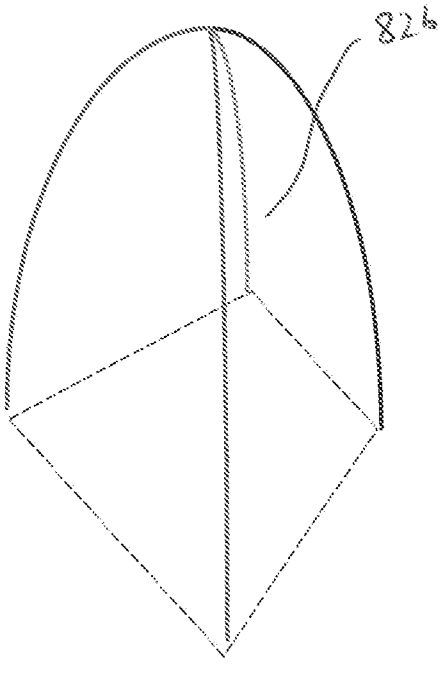
Figure 8D:
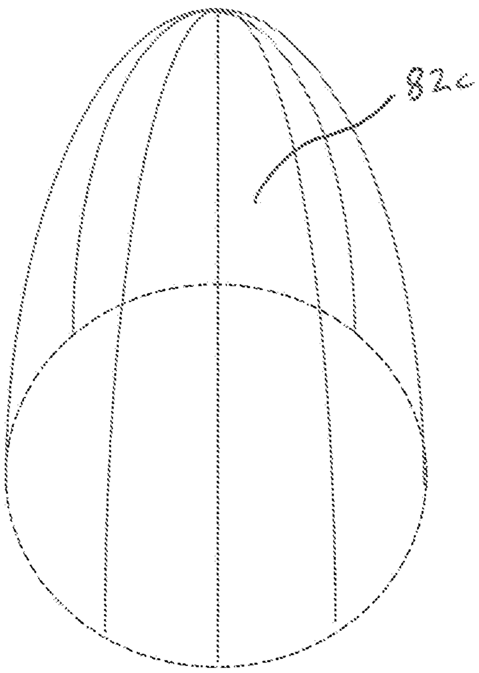

The dome shape of the continuous jet of fluid 80 will have a variable cross-section along the axial direction, whereby the dome shape will be wider in the transverse direction at a downstream end thereof due to the fluid expansion that occurs when the fluid exits the nozzle opening 34. The continuous jet of fluid will maintain this substantially dome shape appearance for a distance of about 8-20 mm after it has exited the nozzle 30 before disintegrating into discrete droplets. It will be appreciated that the precise number of recesses provided can vary and that this variation will directly influence the appearance of the dome shape of the continuous jet of fluid 80 that is exhibited. For example, FIGS. 8*b*-8*d* provide further examples of continuous jets 82*a*-*c* of fluid of substantially dome shape. These variations can be produced by different nozzle configurations. FIG. 8*b* presents a similar case to the earlier described embodiment, but with only three recesses. FIG. 8*c* provides a scenario where there are four recesses, but not all of the same dimension. FIG. 8*d* presents a similar case to the earlier described embodiment, but with eight recesses. These examples are merely exemplary and illustrate that the defined dome shape could be of varying appearance.

Figure 9:
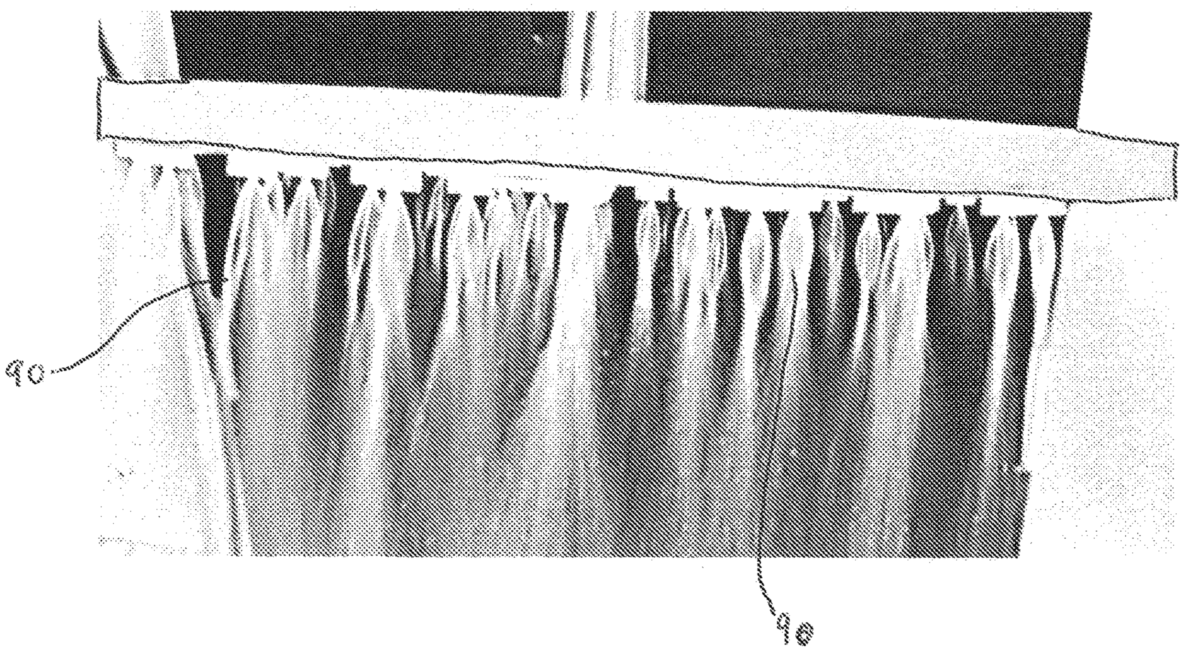
FIG. 9 is a photograph of a spray head in the form of a shower head according to an embodiment of the invention.

FIG. 9 provides a photograph of shower head 10 in use with a continuous jet of fluid 90 of substantially dome shape shown. It will be appreciated that shower head 10 provides several advantages relative to some conventional shower heads (and some spray heads more generally). The continuous jet of fluid of substantially dome shape provides enhanced fluid coverage per nozzle. This means that the spray head can be provided with a reduced number of nozzles and still provide as much spatial coverage relative to some prior art spray heads with the same number of nozzles. The spray head can therefore work particularly well in low-pressure water supply applications. Further, by producing swirled fluid flow upstream of the nozzle opening, a self-cleaning function can be realised, thereby reducing or preventing clogging of the nozzle openings by external contaminants or debris.

Figure 11:
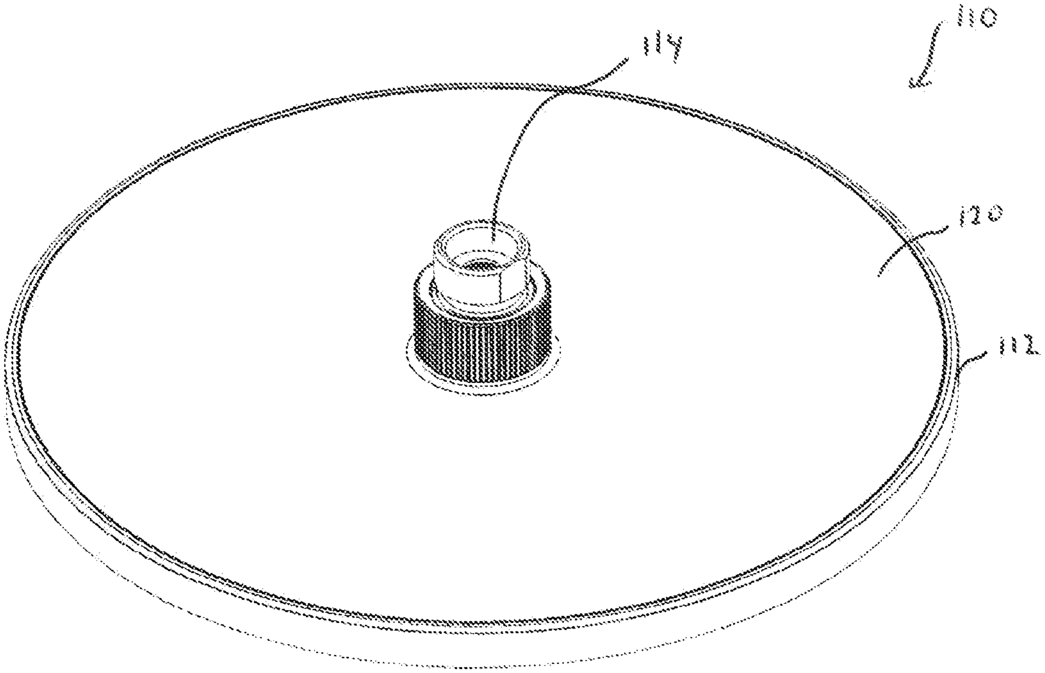
FIG. 11 is an upper perspective view of a shower head in accordance with another embodiment of the present invention.
Figure 12:
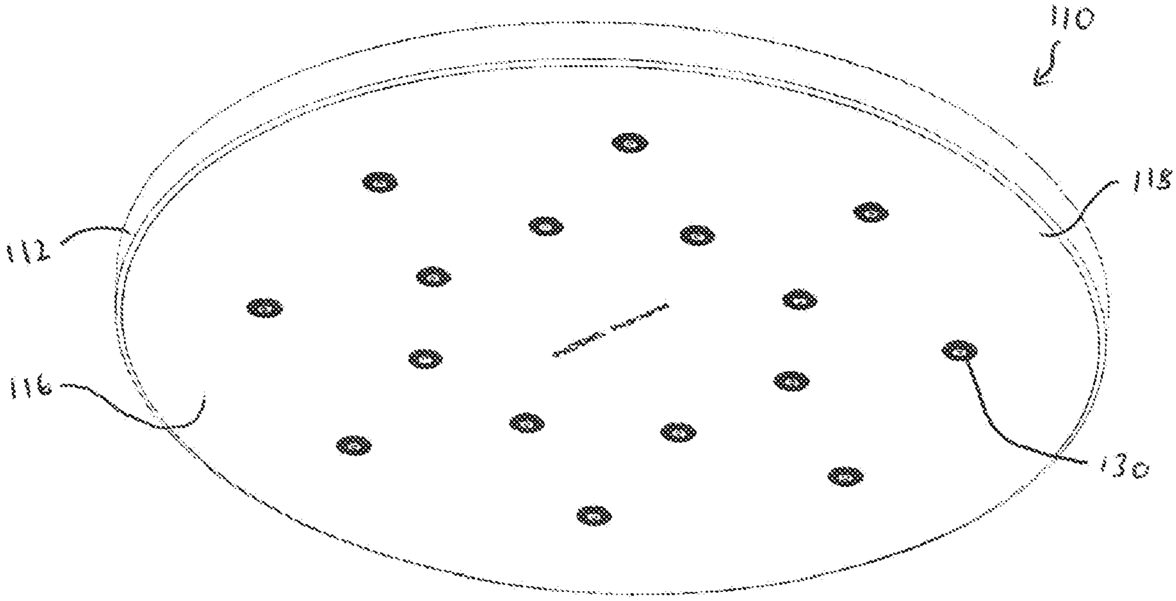
FIG. 12 is a lower perspective view of the shower head of FIG. 11.
Figure 13:
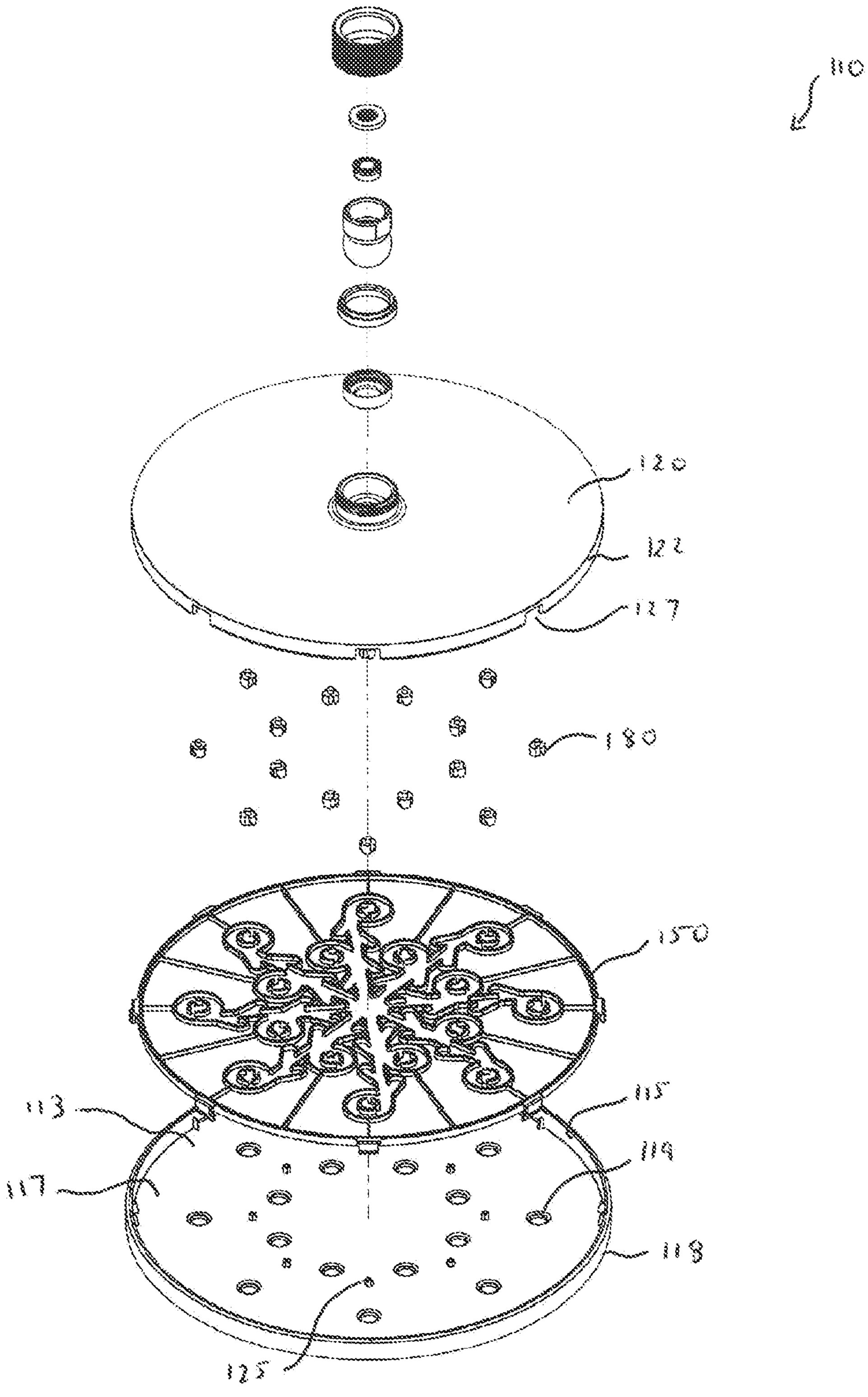
FIG. 13 is an exploded view of the shower head of FIG. 11.

Reference is now made to FIGS. 11-13, which depict a spray head 110 in accordance with another embodiment of the present invention. The spray head is in the form of a shower head 110, for use in an overhead shower, albeit the spray head described herein could alternatively be in the form of a hand shower or other similar spray head.

The shower head 110 includes a generally cylindrical housing 112, a central inlet 114 for receiving fluid, typically water, from a fluid conduit connected to a water supply (not shown), and a plurality of nozzles 130. Each nozzle 130 includes a nozzle body 132 of substantially frustoconical form (best shown in FIG. 18), although it will be appreciated from FIG. 12 that each nozzle body 132 terminates almost flush with outer surface 116 of base 118 when viewed from outside of the assembled shower head 100). Thus, unlike the embodiment of shower head 10, where each nozzle body 32 effectively formed a portion of base 18 of housing 12, each nozzle body 132 instead forms a portion of an inner core 150, with each nozzle body 132 extending through a corresponding aperture 119 extending between inner surface 117 and outer surface 116 of base 118 of housing 112. It will be appreciated that the depicted form of nozzle body 132 is just exemplary, and may be of any other suitable form. The plurality of nozzle bodies 132 and corresponding apertures 119 of base 118 are arranged in a circular concentric ring array having two rings in the current embodiment. In a hand shower application, which generally has a smaller housing than a typical overhead shower head, there may be fewer rings, e.g. only one ring. However, a person skilled in the art will appreciate that the number and arrangement of nozzles could be varied without departing from the scope of the present invention.

As shown in FIG. 13, housing 112 includes the base 118, a cover 120 and disk-shaped inner core 150 configured to be received between base 118 and cover 120. Inner core 150 will be described in greater detail below. Base 118, cover 120 and inner core 150 can be assembled and fixed together in any suitable manner known in the art. In the present embodiment, base 118 includes a side wall 115 extending upwardly from inner surface 117 thereof towards cover 120, the side wall 115 spanning the entire circumference of base 118. In this way, inner surface 117 and side wall 115 together define a cavity 113 sized to receive inner core 150 therein.

Figure 14:
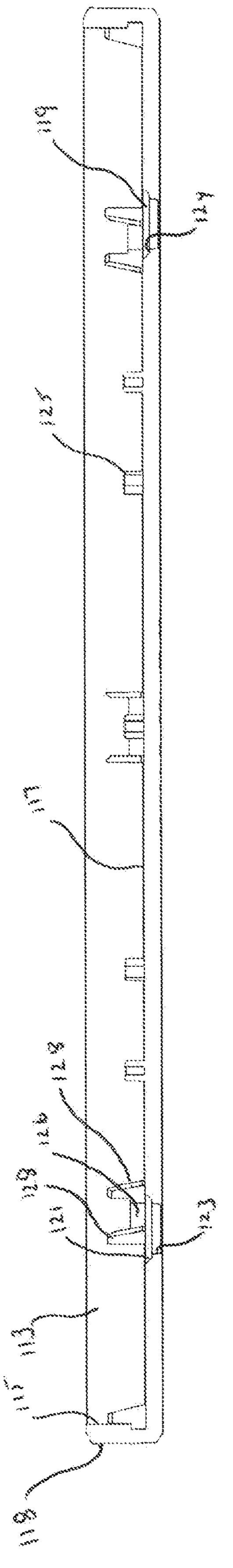
FIG. 14 is a front section view of a base of the shower head of FIG. 11.

With reference to FIG. 14, each aperture 119 is defined by a frustoconical portion 121 adjacent inner surface 117 and a concentric substantially cylindrical portion 123 adjacent outer surface 116. The frustoconical portion 121 converges in a downstream direction and terminates at an inner rim 124, with the cylindrical portion 123 of aperture 119 extending from a radially inner portion of rim 124 downwardly and terminating at outer surface 116. As will be described further below, aperture 119 is suitably shaped to receive a respective nozzle body 132 in a fitting engagement when inner core 150 is assembled with base 118.

Figure 16:
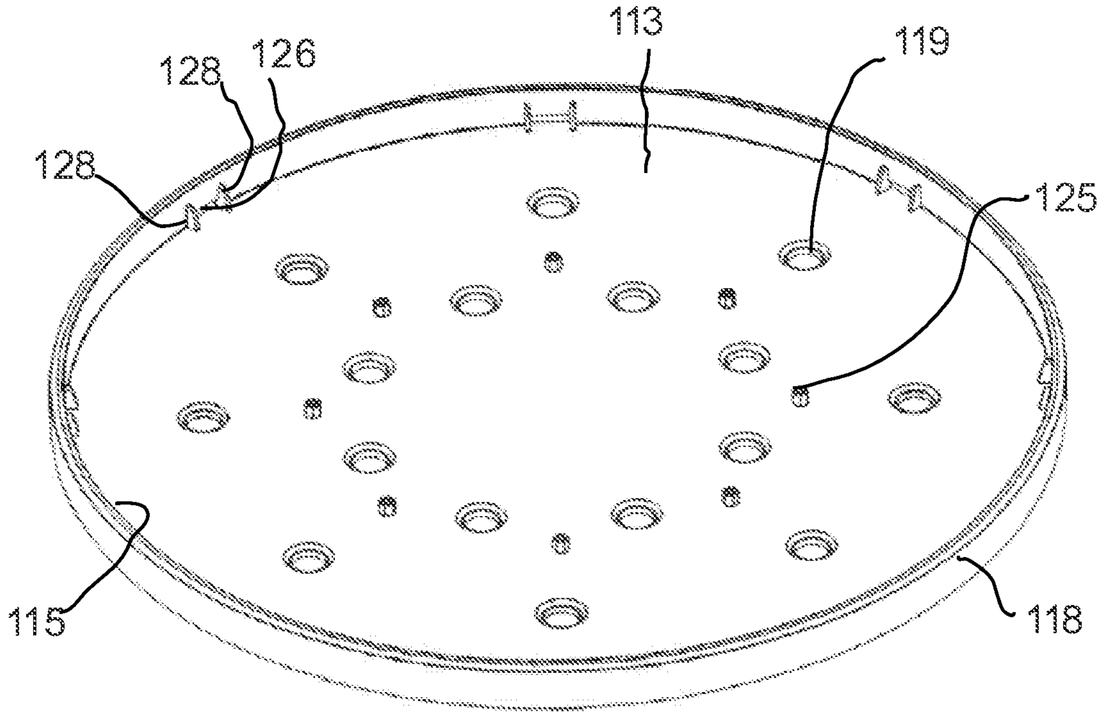
FIG. 16 is an upper perspective view of the base of the shower head of FIG. 11.

Base 118 further includes a plurality of locating protrusions 125 extending upwardly from inner surface 117 towards cover 120 arranged in a circular ring in the current embodiment, each protrusion 125 disposed between, and radially outwardly from, adjacent pairs of apertures 119 of the radially innermost ring of apertures 119. Protrusions 125 are configured to complementarily engage with corresponding features located on a lower surface 152 of inner core 150 in order to properly locate and align inner core 150 relative to base 118. As best shown in FIG. 16, base 118 also includes a plurality of circumferentially spaced grooves 126, which extend generally radially outwardly from an inner surface of side wall 115 of base 118. Grooves 126 are configured to matingly engage with corresponding tongue portions 155 (FIG. 17) of inner core 150 as will be explained below. Disposed on either side of each groove 126 is a substantially wedge-shaped wall 128 that generally extends upwardly from inner surface 117 and radially inwardly from side wall 115. Walls 128 have two main functions in this arrangement—each pair of walls 128 embrace one of the tongue portions 155 of inner core 150 therebetween in order to prevent rotational movement of inner core 150 relative to base 118 when grooves 126 and tongue portions 155 are suitably engaged, and to act as a further locating feature for assembling inner core 150 to base 118.

Figure 17:
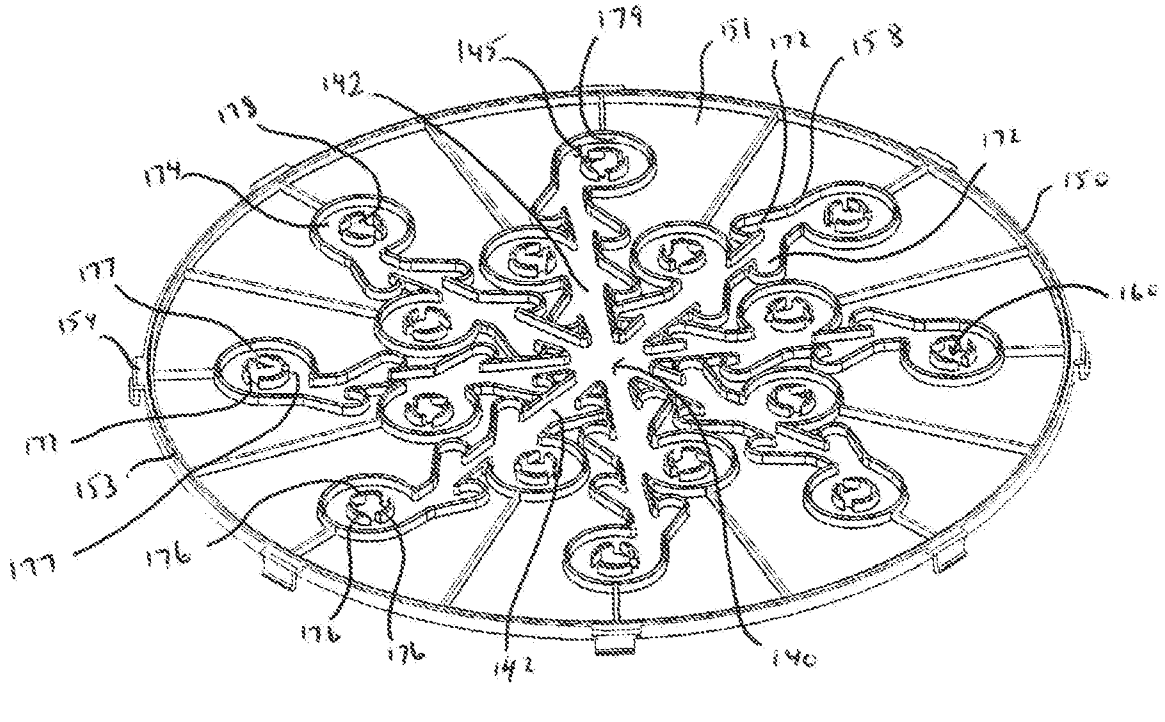
FIG. 17 is an upper perspective view of an inner core of the shower head of FIG. 11.

Reference is now made to FIG. 17, which depicts one embodiment of inner core 150. A plurality of radially outwardly and downwardly extending engagement tabs 154 are spaced circumferentially about side wall 153 of inner core 150. Each tab 154 includes a radially outwardly protruding tongue portion 155 at a lower end thereof configured to engage with grooves 126 of base 118. Each tab 154 is sized to be received between walls 128. The tabs 154 are resiliently deflectable to assist in assembling inner core 150 to base 118 as will be explained further below.

Figure 18:
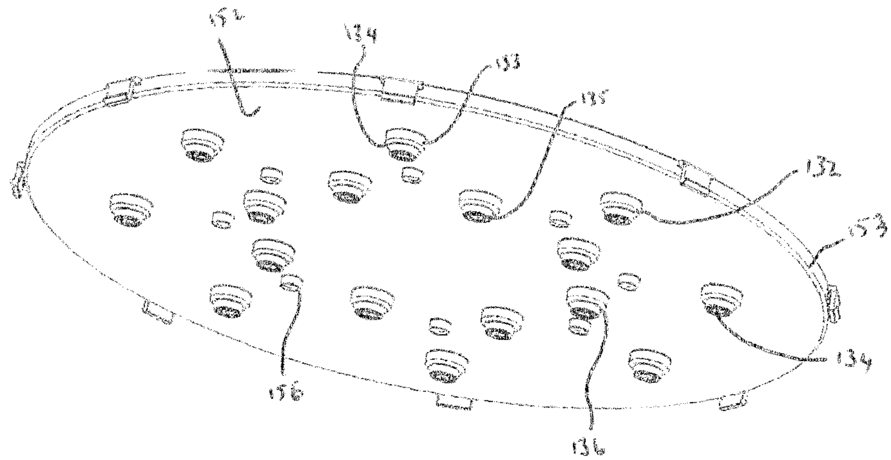
FIG. 18 is a lower perspective view of the inner core of FIG. 17.

Reference is made to FIG. 18, which depicts the plurality of nozzle bodies 132 extending from a lower surface 152 of inner core 150. It will be appreciated that only a portion of nozzle bodies 132 is visible from outside housing 112 when inner core 150 is assembled with base 118 (as per FIG. 12). The shape of each nozzle body 132 comprises a first substantially cylindrical portion 133 extending downwardly from a lower surface 152 of inner core 150, a second frustoconical portion 134 extending downwardly from cylindrical portion 133 and converging in the downstream direction, and a third substantially cylindrical portion 135 extending downwardly from a lower surface of the second frustoconical portion 134, wherein the third substantially cylindrical portion 135 has a reduced width dimension relative to the lower surface of the second frustoconical portion 134. As a result of the reduced width of the third substantially cylindrical portion 135, a planar, annular surface 136 is formed that assists the assembly of inner core 150 and base 118 as will be further described below.

Inner core 150 further includes a plurality of locating tubular portions 156 extending downwardly from lower surface 152 towards base 118 arranged in a circular ring in the current embodiment, each tubular portion 156 disposed between, and radially outwardly from, adjacent pairs of nozzle bodies 132 of the radially innermost ring of nozzle bodies 132. Tubular portions 156 are configured to complementarily engage with protrusions 125 located on base 118 in order to properly locate and align inner core 150 relative to base 118.

Figure 15:
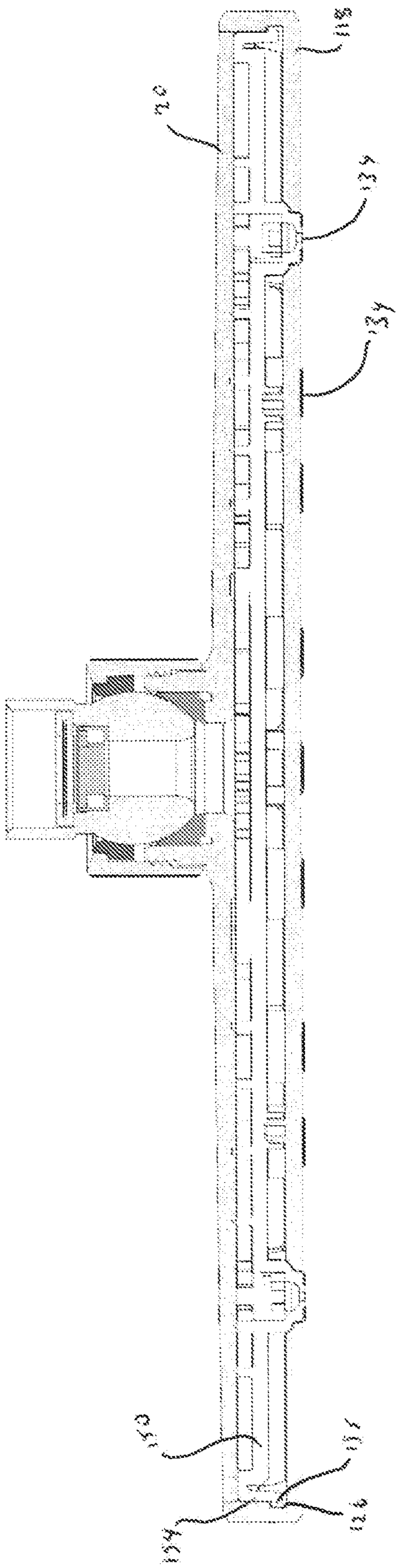
FIG. 15 is a front section view of the shower head of FIG. 11.

Thus, in order to assemble inner core 150 with base 118, the inner core 150 and base 118 are aligned with respect to one another with the assistance of the locating protrusions 125 and locating tubular portions 156. Correct alignment of these locating features will correspond to correctly locating each nozzle body 132 about each aperture 119 of base 118, as well as correctly locating grooves 126 about respective tabs 154. Engaging the inner core 150 with base 118 involves bringing the inner core 150 and base 118 together such that the locating protrusions 125 are received within the locating tubular portions 156 and the nozzle bodies 132 are correctly engaged with their respective apertures 119. It will be appreciated that when suitably engaged, the outer surface of each nozzle body 132 will abut against the inner surfaces of the frustoconical portion 134 and the substantially cylindrical portion 123 of each aperture 119, including direct abutment of rim 124 of aperture 119 with annular surface 136 of nozzle body 132. Further, resiliently deflectable tabs 154 will need to be radially inwardly deflected such that upon release of the tabs 154, each tongue portion 155 engages with a respective groove 126 (e.g. the tongue portions 155 'hook' into grooves 126). FIG. 15 shows a section view of the assembled shower head 110 and the engagement between tabs 154 and grooves 126.

As shown in FIG. 13, cover 120 includes a side wall 122 extending downwardly from an inner surface thereof towards base 118, the side wall 122 spanning the entire circumference of base 118, except for a plurality of cut-out portions 127, which are equispaced about the circumference of cover 120. The cut-out portions 127 are configured to seat over the tabs 154 of inner core 150 when the cover 120 is assembled with the inner core 150. To complete the assembly, and ensure that housing 112 is fluidly sealed, cover 120, inner core 150 and base 118 are fixedly attached, for example by welding (with any other seals or sealing surfaces included as required).

Reference is again made to FIG. 17, which shows the inner core 150 of the shower head 110. As will be explained in greater detail below, housing 112 includes structure defining a fluid pathway 140, formed at least in part by inner core 150. The fluid pathway 140 defines a flow path for the fluid from its entry into housing 112 via inlet 114, to its exit from housing 112 via nozzle openings 134 (FIG. 14). In particular, a portion of the fluid pathway 140 includes structure that is configured to act as a swirl inducer 145 to enhance the rotational motion of the fluid, thereby producing swirled fluid flow, before it reaches the nozzle openings 134. Whilst in the depicted embodiment, the fluid pathway 140 is substantially defined by inner core 150, in alternative embodiments, housing 112 may include structure that is formed on, with, or adjacent the inner core 150.

Inner core 150 includes a baffle arrangement 158 that defines a plurality of flow channels 142 in direct fluid communication with inlet 114 of housing 112. It will be appreciated that flow channels 142 each originate from a location that is aligned axially with inlet 114 in the assembled shower head 110. Thus, all fluid entering the shower head 110 from inlet 114 is communicated within housing 112 via the flow channels 142. Each flow channel 142 extends in a transverse direction from a centre of the upper surface 151 of inner core 150 towards an outer end thereof. In the present embodiment, there are a total of eight flow channels 142 angularly spaced relative to one another by an angle of about 45°. Each flow channel 142 is configured to communicate fluid to a plurality of flow chambers 160, each flow chamber 160 associated with a respective nozzle 130. In the present embodiment, it will be understood that each nozzle 130 is made up of three main parts—(1) entry structure (described in greater detail below); (2) flow chamber 160; and (3) exit structure, including nozzle opening 134. Nozzle 130 is configured to shape swirled fluid flow exiting nozzle opening 134 into a continuous jet of fluid of substantially dome shape. However, it will be appreciated that in other embodiments, nozzle 130 may not include all three parts.

The baffle arrangement 158 includes a plurality of flow resistance pockets 172 spaced along a span of each flow channel 142, each flow resistance pocket 172 extending in a transverse and upstream direction from its respective flow channel 142. The plurality of flow resistance pockets 172 together define a fixed-geometry passive check valve arrangement (also known as a "Tesla valve"). In such an arrangement, water generally travels with minimal resistance in a downstream direction, i.e. from the beginning of flow channel 142 and travelling towards nozzle 130, but is restricted from travelling back in an upstream direction. This restriction or resistance to allow flow to travel back upstream is a result of the intricate internal design of this portion of the baffle arrangement 158 that forces fluid moving upstream to travel into flow resistance pockets 172, where the fluid will effectively loop back on itself along the baffles that define the flow resistance pocket 172. Thus, when water flows back into the flow distribution channel 142 from the flow resistance pockets 172, it becomes turbulent and slows down, halting the flow. Thus, shower head 110 is provided with a backflow prevention feature that also provides better aeration of the water, thereby ultimately creating larger droplets of water that provides the appearance and feeling of more water than there really is.

One of the functions of shower head 110 is to produce swirled fluid flow upstream of nozzle openings 134. As previously mentioned, the need to precondition the fluid in this way before it reaches nozzle openings 134 is important in producing the desired fluid pattern exiting nozzle openings 134, i.e. a continuous jet of fluid of substantially dome shape. To this end, shower head 110 is provided with a swirl inducer 145 adapted to produce, when in use, swirled fluid flow. In the present embodiment, part of the swirl inducer 145 is provided by the baffle arrangement 158. Swirl inducer 145 includes a plurality of substantially circular swirling regions 174, defined by parts of baffle arrangement 158, that extend in a generally transverse direction from flow channel 142. The swirling regions 174 are disposed in a such a way that the flow channel 142 is oriented substantially tangentially to circular swirling regions 174 such that water entering the swirling regions 174 from the flow distribution channel 142 is urged to traverse along inner walls of the baffle arrangement 158 that define the swirling region 174, thereby causing the fluid to swirl by enhancing the rotational motion of the fluid. It will be appreciated that the fluid will be swirled in a generally transverse plane of shower head 110. Disposed within each swirling region 174 is a plurality of substantially arcuate-shaped baffles 176 (three in the depicted embodiment) extending upwardly from inner core 150 and spaced about the upstream end of each flow chamber 160. The arcuate-shaped baffles 176 together surround a substantial portion of the periphery of the upstream end of the flow chamber 160, except for passages 177 defined between adjacent pairs of arcuate-shaped baffles 176 as shown in FIG. 17. Passages 177 are oriented substantially tangentially to the upstream end of the flow chamber 160, such that water passing through passages 177 is urged to divert along an inner surface 178 of arcuate-shaped baffles 176, causing or further promoting the fluid to swirl by enhancing the rotational motion of the fluid upon entry into the flow chamber 160. Again, the fluid will be swirled in a generally transverse plane of shower head 110.

Figure 20:
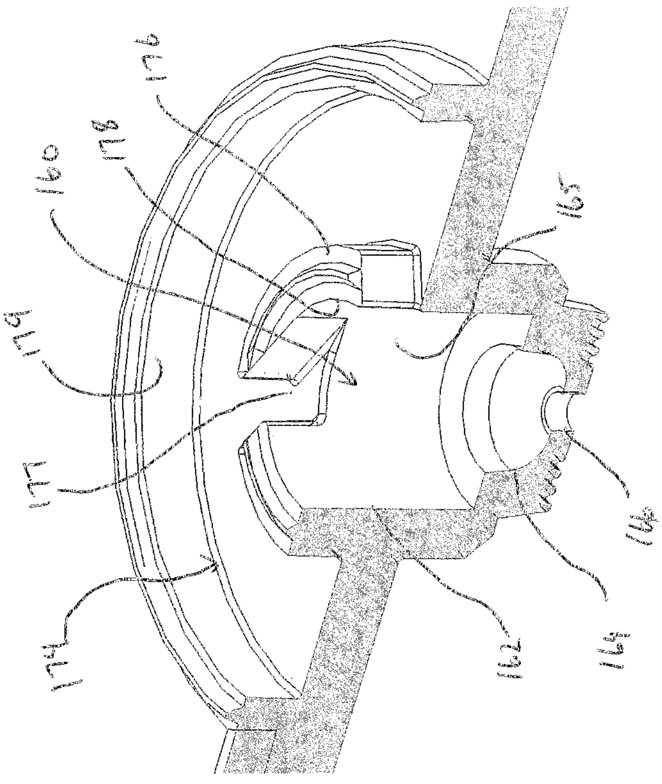
FIG. 20 is a perspective section view of a portion of the inner core of FIG. 17.

Flow chamber 160 extends from upper surface 151 of inner core 150 to the lower surface 152 of inner core 150, i.e. in the axial direction. With reference to FIG. 20, flow chamber 160 includes a first, cylindrical portion 162 configured to receive at an upstream end thereof fluid from passages 177. Flow chamber 160 further includes a second, substantially hemispherical portion 164, which extends from a downstream end of the cylindrical portion 162. The hemispherical portion 164 generally converges in a downstream direction, thereby accelerating the fluid that passes therethrough. Flow chamber 160 also includes a third, cylindrical portion 166, which extends from a downstream end of the hemispherical portion 164. The downstream end of the cylindrical portion 166 defines a nozzle opening 134 from which the swirled fluid exits the housing 112.

In this embodiment, the fluid is swirled due to the specific arrangement of the swirling region 174 relative to the flow channel 142 and the arrangement of passages 177 relative to flow chamber 160, particularly aided by the arcuate-shaped baffles 176. In order to cause the fluid to swirl by enhancing the rotational motion of the fluid, a longitudinal axis of flow channel 142 is offset relative to a central axis of the circular swirling region 174, i.e. the respective axes do not intersect (as would be best appreciated from FIG. 17). In the present example, the flow channel 142 is arranged substantially tangential to the swirling region 174. Thus, when fluid from the flow channel 142 reaches the swirling region 174, rather than following a sharp 90° bend, this offset will cause the fluid to be directed to and impinge on side wall 179 of swirling region 174, with the fluid diverted along side wall 179, thereby inducing the fluid to swirl. In other words, a rotational speed component is imparted on the flow. In addition, a longitudinal axis of each passage 177 is offset relative to a longitudinal axis of the flow chamber 160, i.e. the respective longitudinal axes do not intersect. Fluid in the swirling region 174 is urged by the direction of flow to move through passages 177 (the path of least resistance) between the arcuate-shaped baffles 176. The passages 177 are arranged substantially tangential to the flow chamber 160. Thus, when fluid travels through passages 177, rather than following a sharp 90° bend, this offset will cause the fluid to be directed to and impinge on the inner surface 178 of arcuate shaped walls 176, with the fluid diverted along inner surface 178, thereby inducing the fluid to swirl. In other words, a rotational speed component is imparted (or further imparted) on the flow.

As well as playing a role in causing fluid to swirl, flow chamber 160 is also adapted to maintain swirling of the swirled fluid. For example, side walls 165 of hemispherical portion 164 provide a converging, rounded flow surface that maintains and continues to promote rotational motion of the fluid, as well as accelerating the swirled fluid as it ultimately approaches nozzle opening 134.

Figure 19A:
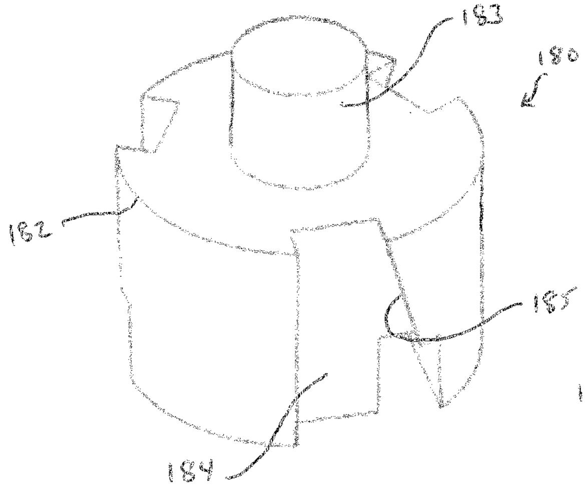
FIG. 19A is an upper perspective view of a swirl insert of the shower head of FIG. 11.
Figure 19B:
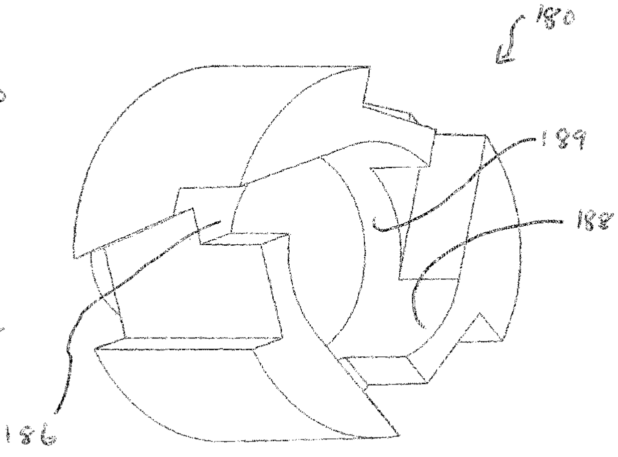
FIG. 19B is a lower perspective view of the swirl insert of FIG. 19B.

In order to promote further swirling of flow, swirl inducer 145 further includes a plurality of hollow body swirl inserts 180, each swirl insert 180 configured to be received in each respective flow chamber 160. As best shown in FIGS. 19A and 19B, swirl insert 180 has a substantially cylindrical outer profile 182, with, in this embodiment, three radially inwardly directed cut-out portions 184 extending along the whole length of the insert 180 and spaced equidistantly about the insert 180. The outer profile 182 is shaped complementarily with the inner surface of cylindrical portion 162 of the flow chamber 160 in order to enable the insert 180 to be seated in a manner whereby the insert 180 does not translate or rotate relative to the cylindrical portion 162 during use. A cylindrical projection 183 extends from an upper surface of each insert 180, wherein the cylindrical projection 183 is adapted to enable the insert 180 to be manually inserted or removed during assembly of the insert 180 with inner core 150.

Cut-out portions 184 are of substantially helical form. This substantially helical shaping of the cut-out portions 184, in particularly outer sloping surface 185 that is encountered by the fluid, is designed to generally direct the fluid through a channel 186 extending towards the inside of insert 180. The fluid travelling through channel 186 is directed towards shaped inner surfaces 188 as best shown in FIG. 19B. It will be appreciated that channels 186 are arranged substantially tangential to an inner profile 189 of insert 180, thereby causing the fluid to be diverted along shaped inner surfaces 188, thereby inducing the fluid to swirl. In other words, a rotational speed component is imparted (or further imparted) on the flow. It will be appreciated that the insert 180 will cause the fluid to be swirled (at least in part) in a vertical plane (as opposed to swirling of the fluid taking place only in a transverse plane as would be the case without insert 180). Such additional swirling can assist in achieving the desired fluid output from nozzle opening 134 (i.e. a continuous jet of fluid of substantially dome shape). It will be appreciated however that using swirl inserts 180 is not essential to producing a desired continuous jet of fluid of substantially dome shape.

Whilst the swirl inducer 145 of this described embodiment includes the specific arrangement of provided by the flow channel 142, swirling region 174, arcuate-shaped baffles 176, insert 180 and flow chamber 160, it will be appreciated that other structure can be provided in housing 112, either directly formed with inner core 150 or otherwise provided in housing 112. Ultimately, the role of the swirl inducer 145 is to precondition, i.e. swirl, the fluid upstream of nozzle opening 134 so that swirled fluid reaches the nozzle opening 134. To this end, a person skilled in the art will appreciate that the structure of the swirl inducer 145 can assume many forms or can be situated at other suitable locations within the shower head 110.

Figure 21:
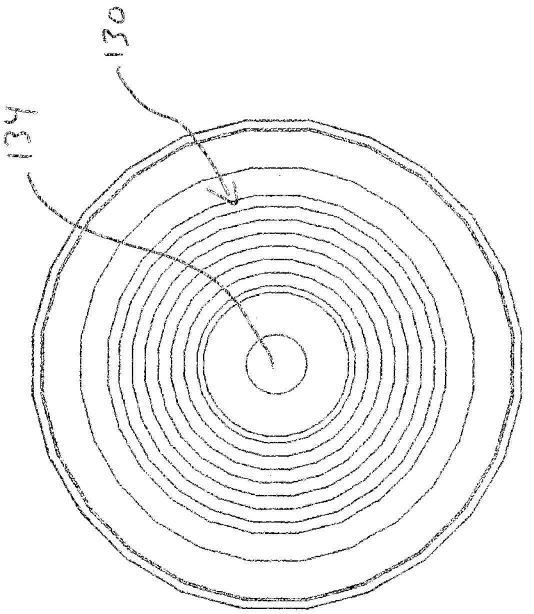
FIG. 21 is a close-up bottom view of a nozzle of the shower head of FIG. 11.

As shown in FIG. 21, which provides a close-up view of a nozzle 130 (as seen from outside housing 112, it will be appreciated that in this embodiment of the invention, there is no additional exit structure about nozzle opening 134 to assist in shaping the exiting fluid (the visible concentric annular rings are aesthetic features that do not play a functional role in shaping the exiting fluid). Due to centrifugal force, the swirled fluid exiting the nozzle opening 134 will tend to expand outwardly from nozzle opening 134, whereby nozzles 130 are adapted to shape the swirled fluid flow exiting from nozzle opening 134 into a continuous jet of fluid of substantially dome shape. In other words, the fluid will have a three-dimensional shape or appearance after it exits the nozzle 130, this three-dimensional shape being formed by the nozzle 130 from the swirled fluid. In the present embodiment, the dome shape is formed by the expansion of the swirled fluid as it exits the nozzle opening 134. The centrifugal force of the swirled fluid urges the fluid in a generally radial direction during expansion.

Figure 22:
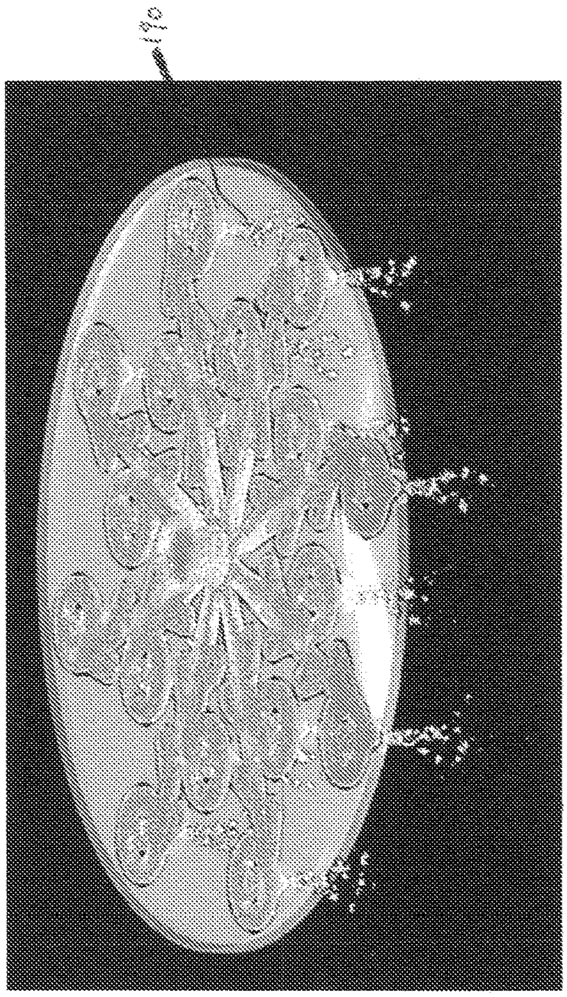
FIG. 22 is an illustration from a computational fluid dynamic model of the shower head of FIG. 11 in use.
Figure 24:
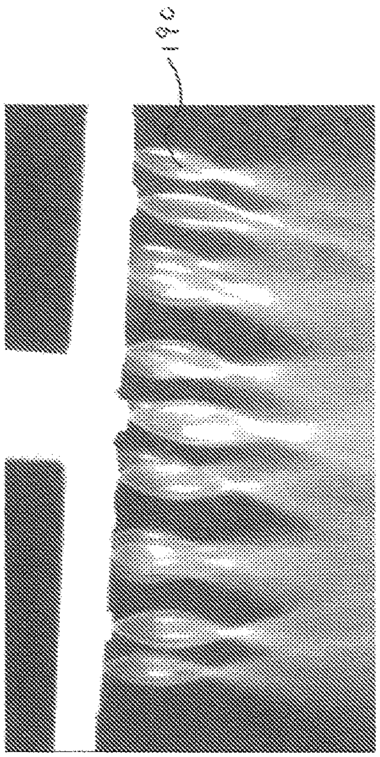
FIG. 24 is a photograph of the shower head of FIG. 23 under a low volume fluid condition.
Figure 23:
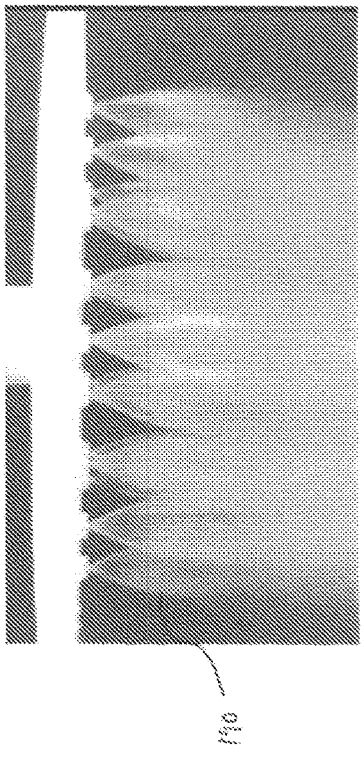
FIG. 23 is a photograph of a spray head in the form of a shower head according to an embodiment of the invention under a high volume fluid condition.

As shown in FIGS. 22-24, the dome shape of the continuous jet of fluid 190 will have a variable cross-section along the axial direction, whereby the dome shape will be wider in the transverse direction at a downstream end thereof due to the fluid expansion that occurs when the fluid exits the nozzle opening 134. In a high volume spray pattern example (see FIG. 23), the continuous jet of fluid will maintain this substantially dome shape appearance for a distance of about 10-20 mm after it has exited the nozzle 130 before disintegrating into discrete droplets. In a low volume spray pattern example (see FIG. 24), the continuous jet of fluid will maintain this substantially dome shape appearance for a distance of about 20-40 mm after it has exited the nozzle 130 before it begins to converge and collapse into itself, thereby disintegrating into discrete droplets. Variations of these shapes can be produced by different nozzle configurations as will be appreciated by a person skilled in the art. These examples are merely exemplary and illustrate that the defined dome shape could be of varying appearance.

It will be appreciated that shower head 110 provides several advantages relative to some conventional shower heads (and some spray heads more generally). The continuous jet of fluid of substantially dome shape provides enhanced fluid coverage per nozzle. This means that the spray head can be provided with a reduced number of nozzles and still provide as much spatial coverage relative to some prior art spray heads with the same number of nozzles. The spray head can therefore work particularly well in low-pressure water supply applications. Further, by producing swirled fluid flow upstream of the nozzle opening, a self-cleaning function can be realised, thereby reducing or preventing clogging of the nozzle openings by external contaminants or debris.

Spray heads in accordance with the present invention may be made of any suitable materials that enable suitable function thereof. For example, the spray head (and various components thereof) may be made from one or more of plastic (e.g. ABS plastic, acetal copolymer (POM)), metals (including suitable alloys) and the like. The spray heads will generally also include suitable fluid seals and, for some applications, components for mounting and/or positional adjustment (e.g. bearings).

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A spray head including:

an inlet for receiving fluid;

a plurality of nozzles in fluid communication with the inlet, wherein each nozzle of the plurality of nozzles defines a nozzle opening at a downstream end thereof;

a housing that defines a fluid pathway such that, when in use, fluid enters the housing via the inlet and exits the housing from the nozzle openings;

a swirl inducer downstream of the inlet and adapted to produce, when in use, a swirled fluid flow, wherein the swirl inducer is in fluid communication with the inlet and disposed between the plurality of nozzle openings and the inlet, and wherein the swirl inducer is configured to produce the swirled fluid flow before the fluid reaches the nozzle openings, by providing or enhancing a rotational speed component of the fluid; and a back-flow prevention arrangement configured to prevent fluid moving back upstream in the spray head;

wherein each of the plurality of nozzles is associated with a separate and respective flow chamber, which forms a part of the fluid pathway, wherein the flow chamber extends from each respective nozzle opening and into the housing of the spray head;

wherein the fluid pathway includes at least one fluid conduit or channel in fluid communication with the inlet, wherein the at least one fluid conduit or channel is configured to direct fluid to each flow chamber, wherein the back-flow prevention arrangement includes a plurality of flow resistance pockets extending in a transverse and upstream direction from its respective fluid conduit or channel;

wherein the plurality of nozzles are adapted to shape the swirled fluid flow exiting therefrom into a continuous jet of fluid of dome shape.

2. The spray head of claim 1, wherein the swirl inducer includes structure disposed within the housing, wherein the structure is configured, when in use, to induce or generate rotational motion in the fluid.

3. The spray head of claim 1, wherein the swirl inducer is adapted, when in use, to swirl fluid in a generally transverse plane of the spray head to produce the swirled fluid flow.

4. The spray head of claim 1, wherein the at least one fluid conduit or channel is configured to convey fluid in a transverse plane of the spray head.

5. The spray head of claim 1, wherein the fluid pathway includes a plurality of fluid conduits or channels, each fluid conduit or channel originating from a common point and extending towards a radially outer end of the housing.

6. The spray head of claim 5, wherein the plurality of fluid conduits or channels are angularly spaced relative to one another such that, in use, the fluid is evenly distributed along each fluid conduit or channel.

7. The spray head of claim 1, wherein the swirl inducer includes structure defining a plurality of swirling regions in fluid communication with the at least one fluid conduit or channel, wherein each of the plurality of flow chambers is associated with a separate and respective swirling region.

8. The spray head of claim 7, wherein each swirling region is disposed tangentially to its associated fluid conduit or channel.

9. The spray head of claim 1, wherein the swirl inducer includes a plurality of baffles spaced about a flow chamber inlet of each flow chamber, wherein a flow passage is provided between each adjacent pair of baffles and the respective flow passages are disposed tangentially to the flow chamber inlet.

10. The spray head of claim 9, wherein the baffles are arcuate shaped and include diversion surfaces, defined by an inner surface of the baffles, configured to divert the fluid in a manner to enhance rotational motion of the fluid and thereby produce the swirled fluid flow.

11. The spray head of claim 9, wherein the flow chamber includes structure defining a chamber flow path between the flow chamber inlet and nozzle opening, the chamber flow path adapted to promote or maintain swirling of the fluid.

12. The spray head of claim 1, wherein the swirl inducer further includes a plurality of inserts, each insert configured to be received in the respective flow chambers and configured, when in use, to produce swirled fluid in a generally vertical plane of the spray head.

13. The spray head of claim 1, wherein the plurality of flow resistance pockets are spaced along a span of each fluid conduit or channel.

14. The spray head of claim 2, wherein the housing includes an inner core disposed therein, wherein the structure is formed on, with, or adjacent the inner core.

15. The spray head of claim 1, wherein the spray head is in the form of a shower head.

* * * * *